United States Patent
More et al.

(10) Patent No.: US 10,963,578 B2
(45) Date of Patent: *Mar. 30, 2021

(54) METHODS AND SYSTEMS FOR PREVENTING TRANSMISSION OF SENSITIVE DATA FROM A REMOTE COMPUTER DEVICE

(71) Applicant: Workshare Technology, Inc., San Francisco, CA (US)

(72) Inventors: Scott More, Tokyo (JP); Ilya Beyer, San Mateo, CA (US)

(73) Assignee: Workshare Technology, Inc., San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/886,376

(22) Filed: Feb. 1, 2018

(65) Prior Publication Data

US 2018/0196953 A1   Jul. 12, 2018

Related U.S. Application Data

(63) Continuation of application No. 14/745,656, filed on Jun. 22, 2015, now Pat. No. 9,959,417, which is a (Continued)

(51) Int. Cl.
*G06F 7/04* (2006.01)
*H04N 7/16* (2011.01)
(Continued)

(52) U.S. Cl.
CPC ............ *G06F 21/62* (2013.01); *G06F 21/554* (2013.01); *G06F 21/6245* (2013.01);
(Continued)

(58) Field of Classification Search
CPC .. G06F 21/62; G06F 21/6218; G06F 21/6227; G06F 21/6236; G06F 21/554;
(Continued)

(56) References Cited

U.S. PATENT DOCUMENTS 4,479,195 A   10/1984   Herr et al.
4,949,300 A   8/1990   Christenson et al.
(Continued)

FOREIGN PATENT DOCUMENTS

JP   10177650      6/1998
JP   2004265267    9/2004
(Continued)

OTHER PUBLICATIONS

Final Office Action dated Apr. 16, 2012 in Co-Pending U.S. Appl. No. 12/177,043, filed Jul. 21, 2008.
(Continued)

*Primary Examiner* — Trong H Nguyen
(74) *Attorney, Agent, or Firm* — Nixon Peabody LLP

(57) ABSTRACT

A technique for preventing selected sets of data words from unauthorized transmission out of the secure perimeter of a computer system is disclosed. A set of security rules is applied to an outgoing data message and if one of the set of rules is triggered, scanning by another set of security rules. The server then executes the security command before transmitting the outgoing message out of the secure perimeter of the computer system or blocking transmission.

26 Claims, 7 Drawing Sheets

Related U.S. Application Data continuation of application No. 12/621,429, filed on Nov. 18, 2009, now Pat. No. 9,092,636.

(60) Provisional application No. 61/115,633, filed on Nov. 18, 2008.

(51) Int. Cl.
   *G06F 21/62* (2013.01)
   *G06F 21/55* (2013.01)
   *H04L 29/06* (2006.01)
   *H04L 12/58* (2006.01)

(52) U.S. Cl.
   CPC .............. *H04L 63/10* (2013.01); *H04L 51/12* (2013.01); *H04L 63/083* (2013.01)

(58) Field of Classification Search
   CPC .............. G06F 21/556; G06F 21/6245; G06F 21/6254; H04L 63/10; H04L 2209/42
   See application file for complete search history.

(56) References Cited

U.S. PATENT DOCUMENTS

| | | | |
|---|---|---|---|
| 5,008,853 | A | 4/1991 | Bly et al. |
| 5,072,412 | A | 12/1991 | Henderson, Jr. et al. |
| 5,220,657 | A | 6/1993 | Bly et al. |
| 5,245,553 | A | 9/1993 | Tanenbaum |
| 5,247,615 | A | 9/1993 | Mori et al. |
| 5,293,619 | A | 3/1994 | Dean |
| 5,379,374 | A | 1/1995 | Ishizaki et al. |
| 5,446,842 | A | 8/1995 | Schaeffer et al. |
| 5,608,872 | A | 3/1997 | Schwartz et al. |
| 5,617,539 | A | 4/1997 | Ludwig et al. |
| 5,619,649 | A | 4/1997 | Kovnat et al. |
| 5,634,062 | A | 5/1997 | Shimizu et al. |
| 5,671,428 | A | 9/1997 | Muranaga et al. |
| 5,699,427 | A | 12/1997 | Chow et al. |
| RE35,861 | E | 7/1998 | Queen |
| 5,787,175 | A | 7/1998 | Carter |
| 5,787,444 | A | 7/1998 | Gerken et al. |
| 5,801,702 | A | 9/1998 | Dolan et al. |
| 5,806,078 | A | 9/1998 | Hug et al. |
| 5,819,300 | A | 10/1998 | Kohno et al. |
| 5,832,494 | A | 11/1998 | Egger et al. |
| 5,890,177 | A | 3/1999 | Moody et al. |
| 5,897,636 | A | 4/1999 | Kaeser |
| 5,898,836 | A | 4/1999 | Freivald et al. |
| 6,003,060 | A | 12/1999 | Aznar et al. |
| 6,012,087 | A | 1/2000 | Freivald et al. |
| 6,029,175 | A | 2/2000 | Chow et al. |
| 6,038,561 | A * | 3/2000 | Snyder ..................... G06F 16/34 |
| 6,049,804 | A | 4/2000 | Burgess et al. |
| 6,067,551 | A | 5/2000 | Brown et al. |
| 6,088,702 | A | 7/2000 | Plantz et al. |
| 6,128,635 | A | 10/2000 | Ikeno |
| 6,145,084 | A | 11/2000 | Zuili et al. |
| 6,189,019 | B1 | 2/2001 | Blumer et al. |
| 6,212,534 | B1 | 4/2001 | Lo et al. |
| 6,219,818 | B1 | 4/2001 | Freivald et al. |
| 6,243,091 | B1 | 6/2001 | Berstis |
| 6,263,350 | B1 | 7/2001 | Wollrath et al. |
| 6,263,364 | B1 | 7/2001 | Najork et al. |
| 6,269,370 | B1 | 7/2001 | Kirsch |
| 6,285,999 | B1 | 9/2001 | Page |
| 6,301,368 | B1 | 10/2001 | Bolle et al. |
| 6,317,777 | B1 | 11/2001 | Skarbo et al. |
| 6,321,265 | B1 | 11/2001 | Najork et al. |
| 6,327,611 | B1 | 12/2001 | Everingham |
| 6,336,123 | B2 | 1/2002 | Inoue et al. |
| 6,351,755 | B1 | 2/2002 | Najork et al. |
| 6,356,937 | B1 | 3/2002 | Montville et al. |
| 6,377,984 | B1 | 4/2002 | Najork et al. |
| 6,404,446 | B1 | 6/2002 | Bates et al. |
| 6,418,433 | B1 | 7/2002 | Chakrabarti et al. |
| 6,418,453 | B1 | 7/2002 | Kraft et al. |
| 6,424,966 | B1 | 7/2002 | Meyerzon et al. |
| 6,449,624 | B1 | 9/2002 | Hammack et al. |
| 6,505,237 | B2 | 1/2003 | Beyda et al. |
| 6,513,050 | B1 | 1/2003 | Williams et al. |
| 6,547,829 | B1 | 4/2003 | Meyerzon et al. |
| 6,556,982 | B1 | 4/2003 | McGaffey et al. |
| 6,560,620 | B1 | 5/2003 | Ching |
| 6,584,466 | B1 | 6/2003 | Serbinis et al. |
| 6,591,289 | B1 | 7/2003 | Britton |
| 6,594,662 | B1 | 7/2003 | Sieffert et al. |
| 6,596,030 | B2 | 7/2003 | Ball et al. |
| 6,614,789 | B1 | 9/2003 | Yazdani et al. |
| 6,658,626 | B1 | 12/2003 | Aiken |
| 6,662,212 | B1 | 12/2003 | Chandhok et al. |
| 6,738,762 | B1 | 5/2004 | Chen et al. |
| 6,745,024 | B1 | 6/2004 | DeJaco et al. |
| 6,832,202 | B1 | 12/2004 | Schuyler et al. |
| 6,918,082 | B1 | 7/2005 | Gross |
| 7,035,427 | B2 | 4/2006 | Rhoads |
| 7,085,735 | B1 | 8/2006 | Hall et al. |
| 7,107,518 | B2 | 9/2006 | Ramaley et al. |
| 7,113,615 | B2 | 9/2006 | Rhoads et al. |
| 7,152,019 | B2 | 12/2006 | Tarantola et al. |
| 7,181,492 | B2 | 2/2007 | Wen et al. |
| 7,194,761 | B1 | 3/2007 | Champagne |
| 7,212,955 | B2 | 5/2007 | Kirshenbau et al. |
| 7,233,686 | B2 | 6/2007 | Hamid |
| 7,240,207 | B2 | 7/2007 | Weare |
| 7,299,504 | B1 | 11/2007 | Tiller et al. |
| 7,321,864 | B1 | 1/2008 | Gendler |
| 7,356,704 | B2 | 4/2008 | Rinkevich et al. |
| 7,434,164 | B2 | 10/2008 | Salesin et al. |
| 7,454,778 | B2 | 11/2008 | Pearson et al. |
| 7,496,841 | B2 | 2/2009 | Hadfield et al. |
| 7,564,997 | B2 | 7/2009 | Hamid |
| 7,570,964 | B2 | 8/2009 | Maes |
| 7,613,770 | B2 | 11/2009 | Li |
| 7,624,447 | B1 | 11/2009 | Horowitz et al. |
| 7,627,613 | B1 | 12/2009 | Dulitz et al. |
| 7,640,308 | B2 | 12/2009 | Antonoff et al. |
| 7,673,324 | B2 | 3/2010 | Tirosh et al. |
| 7,680,785 | B2 | 3/2010 | Najork |
| 7,685,298 | B2 | 3/2010 | Day |
| 7,694,336 | B2 | 4/2010 | Rinkevich et al. |
| 7,707,153 | B1 | 4/2010 | Petito et al. |
| 7,720,256 | B2 | 5/2010 | Desprez et al. |
| 7,730,175 | B1 | 6/2010 | Roesch et al. |
| 7,788,235 | B1 * | 8/2010 | Yeo ....................... G06F 21/606 707/687 |
| 7,796,309 | B2 | 9/2010 | Sadovsky et al. |
| 7,797,724 | B2 | 9/2010 | Calvin |
| 7,818,678 | B2 | 10/2010 | Massand |
| 7,844,116 | B2 | 11/2010 | Monga |
| 7,857,201 | B2 | 12/2010 | Silverbrook et al. |
| 7,877,790 | B2 | 1/2011 | Vishik et al. |
| 7,890,752 | B2 | 2/2011 | Bardsley et al. |
| 7,895,166 | B2 | 2/2011 | Foygel et al. |
| 7,903,822 | B1 | 3/2011 | Hair et al. |
| 7,941,844 | B2 | 5/2011 | Anno |
| 7,958,101 | B1 | 6/2011 | Teugels et al. |
| 8,005,277 | B2 | 8/2011 | Tulyakov et al. |
| 8,042,112 | B1 | 10/2011 | Zhu et al. |
| 8,117,225 | B1 | 2/2012 | Zilka |
| 8,145,724 | B1 | 3/2012 | Hawks et al. |
| 8,181,036 | B1 * | 5/2012 | Nachenberg ........ H04L 63/1416 709/224 |
| 8,196,030 | B1 | 6/2012 | Wang et al. |
| 8,201,254 | B1 | 6/2012 | Wilhelm et al. |
| 8,209,538 | B2 | 6/2012 | Craigie |
| 8,233,723 | B2 | 7/2012 | Sundaresan |
| 8,286,085 | B1 | 10/2012 | Denise |
| 8,286,171 | B2 | 10/2012 | More et al. |
| 8,301,994 | B1 | 10/2012 | Shah |
| 8,316,237 | B1 | 11/2012 | Felsher et al. |
| 8,406,456 | B2 | 3/2013 | More |
| 8,473,847 | B2 | 6/2013 | Glover |
| 8,478,995 | B2 | 7/2013 | Alculumbre |
| 8,555,080 | B2 | 10/2013 | More et al. |

(56) References Cited

U.S. PATENT DOCUMENTS

| | | | |
|---|---|---|---|
| 8,572,388 B2 | 10/2013 | Boemker et al. | |
| 8,620,872 B1* | 12/2013 | Killalea | G06F 17/2235 707/687 |
| 8,635,295 B2 | 1/2014 | Mulder | |
| 8,732,127 B1 | 5/2014 | Rotterdam et al. | |
| 8,776,190 B1 | 7/2014 | Cavage et al. | |
| 8,797,603 B1 | 8/2014 | Dougherty et al. | |
| 8,839,100 B1 | 9/2014 | Donald | |
| 9,092,636 B2 | 7/2015 | More et al. | |
| 9,098,500 B1 | 8/2015 | Asokan et al. | |
| 9,311,624 B2 | 4/2016 | Diament et al. | |
| 9,342,621 B1* | 5/2016 | Raphel | G06F 21/6245 |
| 9,652,485 B1 | 5/2017 | Bhargava et al. | |
| 2001/0018739 A1 | 8/2001 | Anderson et al. | |
| 2001/0042073 A1 | 11/2001 | Saether et al. | |
| 2002/0010682 A1 | 1/2002 | Johnson | |
| 2002/0016959 A1 | 2/2002 | Barton et al. | |
| 2002/0019827 A1 | 2/2002 | Shiman et al. | |
| 2002/0023158 A1 | 2/2002 | Polizzi et al. | |
| 2002/0052928 A1 | 5/2002 | Stern et al. | |
| 2002/0063154 A1 | 5/2002 | Hoyos et al. | |
| 2002/0065827 A1 | 5/2002 | Christie et al. | |
| 2002/0065848 A1 | 5/2002 | Walker et al. | |
| 2002/0073188 A1 | 6/2002 | Rawson, III | |
| 2002/0087515 A1 | 7/2002 | Swannack et al. | |
| 2002/0099602 A1 | 7/2002 | Moskowitz et al. | |
| 2002/0120648 A1 | 8/2002 | Ball et al. | |
| 2002/0129062 A1 | 9/2002 | Luparello | |
| 2002/0136222 A1 | 9/2002 | Robohm | |
| 2002/0138744 A1 | 9/2002 | Schleicher et al. | |
| 2002/0159239 A1 | 10/2002 | Amie et al. | |
| 2002/0164058 A1 | 11/2002 | Aggarwal | |
| 2003/0009518 A1 | 1/2003 | Harrow et al. | |
| 2003/0009528 A1 | 1/2003 | Sharif et al. | |
| 2003/0037010 A1 | 2/2003 | Schmelzer | |
| 2003/0046572 A1 | 3/2003 | Newman et al. | |
| 2003/0051054 A1 | 3/2003 | Redlich et al. | |
| 2003/0061260 A1 | 3/2003 | Rajkumar | |
| 2003/0061350 A1 | 3/2003 | Masuoka et al. | |
| 2003/0078880 A1 | 4/2003 | Alley et al. | |
| 2003/0084279 A1* | 5/2003 | Campagna | H04L 43/00 713/153 |
| 2003/0093755 A1 | 5/2003 | O'Carroll | |
| 2003/0097454 A1 | 5/2003 | Yamakawa et al. | |
| 2003/0112273 A1 | 6/2003 | Hadfield | |
| 2003/0115273 A1 | 6/2003 | Delia et al. | |
| 2003/0131005 A1 | 7/2003 | Berry | |
| 2003/0147267 A1 | 8/2003 | Huttunen | |
| 2003/0158839 A1 | 8/2003 | Faybishenko et al. | |
| 2003/0191799 A1 | 10/2003 | Araujo et al. | |
| 2003/0196087 A1 | 10/2003 | Stringer et al. | |
| 2003/0223624 A1 | 12/2003 | Hamid | |
| 2003/0233419 A1 | 12/2003 | Beringer | |
| 2003/0237047 A1 | 12/2003 | Borson | |
| 2004/0002049 A1 | 1/2004 | Beavers et al. | |
| 2004/0031052 A1 | 2/2004 | Wannamaker et al. | |
| 2004/0122659 A1 | 6/2004 | Hourihane et al. | |
| 2004/0128321 A1 | 7/2004 | Hamer | |
| 2004/0148567 A1 | 7/2004 | Jeon et al. | |
| 2004/0186851 A1 | 9/2004 | Jhingan et al. | |
| 2004/0187076 A1 | 9/2004 | Ki | |
| 2004/0225645 A1* | 11/2004 | Rowney | G06F 21/554 |
| 2004/0261016 A1 | 12/2004 | Glass et al. | |
| 2005/0021980 A1 | 1/2005 | Kanai | |
| 2005/0038893 A1 | 2/2005 | Graham | |
| 2005/0055306 A1 | 3/2005 | Miller et al. | |
| 2005/0055337 A1 | 3/2005 | Bebo et al. | |
| 2005/0071755 A1 | 3/2005 | Harrington et al. | |
| 2005/0108293 A1 | 5/2005 | Lipman et al. | |
| 2005/0138350 A1 | 6/2005 | Hariharan | |
| 2005/0138540 A1 | 6/2005 | Baltus et al. | |
| 2005/0204008 A1 | 9/2005 | Shinbrood | |
| 2005/0251738 A1 | 11/2005 | Hirano et al. | |
| 2005/0251748 A1 | 11/2005 | Gusmorino et al. | |
| 2005/0256893 A1 | 11/2005 | Perry | |
| 2005/0268327 A1 | 12/2005 | Starikov | |
| 2005/0278421 A1 | 12/2005 | Simpson et al. | |
| 2006/0005247 A1* | 1/2006 | Zhang | G06F 21/6245 726/26 |
| 2006/0013393 A1 | 1/2006 | Ferchichi et al. | |
| 2006/0021031 A1 | 1/2006 | Leahy et al. | |
| 2006/0047765 A1 | 3/2006 | Mizoi et al. | |
| 2006/0050937 A1 | 3/2006 | Hamid | |
| 2006/0059196 A1 | 3/2006 | Sato et al. | |
| 2006/0064717 A1 | 3/2006 | Shibata et al. | |
| 2006/0067578 A1 | 3/2006 | Fuse | |
| 2006/0069740 A1 | 3/2006 | Ando | |
| 2006/0098850 A1 | 5/2006 | Hamid | |
| 2006/0112120 A1 | 5/2006 | Rohall | |
| 2006/0129627 A1 | 6/2006 | Phillips | |
| 2006/0158676 A1 | 7/2006 | Hamada | |
| 2006/0171588 A1 | 8/2006 | Chellapilla et al. | |
| 2006/0184505 A1 | 8/2006 | Kedem | |
| 2006/0190493 A1 | 8/2006 | Kawai et al. | |
| 2006/0218004 A1 | 9/2006 | Dworkin et al. | |
| 2006/0218643 A1 | 9/2006 | DeYoung | |
| 2006/0224589 A1 | 10/2006 | Rowney | |
| 2006/0236246 A1 | 10/2006 | Bono et al. | |
| 2006/0253445 A1* | 11/2006 | Huang | G06F 21/554 |
| 2006/0261112 A1 | 11/2006 | Todd et al. | |
| 2006/0271947 A1 | 11/2006 | Lienhart et al. | |
| 2006/0272024 A1* | 11/2006 | Huang | G06F 21/55 726/26 |
| 2006/0277229 A1 | 12/2006 | Yoshida et al. | |
| 2006/0294468 A1 | 12/2006 | Sareen et al. | |
| 2006/0294469 A1 | 12/2006 | Sareen et al. | |
| 2007/0005589 A1 | 1/2007 | Gollapudi | |
| 2007/0011211 A1 | 1/2007 | Reeves et al. | |
| 2007/0025265 A1 | 2/2007 | Porras et al. | |
| 2007/0027830 A1 | 2/2007 | Simons et al. | |
| 2007/0038704 A1 | 2/2007 | Brown et al. | |
| 2007/0094510 A1 | 4/2007 | Ross et al. | |
| 2007/0100991 A1 | 5/2007 | Daniels et al. | |
| 2007/0101154 A1 | 5/2007 | Bardsley et al. | |
| 2007/0101413 A1 | 5/2007 | Vishik et al. | |
| 2007/0112930 A1 | 5/2007 | Foo et al. | |
| 2007/0150443 A1 | 6/2007 | Bergholz et al. | |
| 2007/0179967 A1 | 8/2007 | Zhang | |
| 2007/0192728 A1 | 8/2007 | Finley et al. | |
| 2007/0220061 A1* | 9/2007 | Tirosh | G06F 21/556 |
| 2007/0220068 A1 | 9/2007 | Thompson et al. | |
| 2007/0253608 A1 | 11/2007 | Tulyakov et al. | |
| 2007/0261099 A1 | 11/2007 | Broussard et al. | |
| 2007/0261112 A1 | 11/2007 | Todd et al. | |
| 2007/0294318 A1 | 12/2007 | Arora et al. | |
| 2007/0294612 A1 | 12/2007 | Drucker et al. | |
| 2007/0299880 A1 | 12/2007 | Kawabe et al. | |
| 2008/0022003 A1 | 1/2008 | Alve | |
| 2008/0028017 A1 | 1/2008 | Garbow et al. | |
| 2008/0033913 A1 | 2/2008 | Winburn | |
| 2008/0034282 A1 | 2/2008 | Zernik | |
| 2008/0034327 A1 | 2/2008 | Cisler et al. | |
| 2008/0065668 A1 | 3/2008 | Spence et al. | |
| 2008/0080515 A1 | 4/2008 | Tombroff et al. | |
| 2008/0082529 A1 | 4/2008 | Mantena et al. | |
| 2008/0091465 A1 | 4/2008 | Fuschino et al. | |
| 2008/0091735 A1 | 4/2008 | Fukushima et al. | |
| 2008/0162527 A1 | 7/2008 | Pizano et al. | |
| 2008/0177782 A1 | 7/2008 | Poston et al. | |
| 2008/0209001 A1 | 8/2008 | Boyle et al. | |
| 2008/0215667 A1 | 9/2008 | Rothbarth et al. | |
| 2008/0219495 A1 | 9/2008 | Hulten et al. | |
| 2008/0235760 A1 | 9/2008 | Broussard et al. | |
| 2008/0263363 A1 | 10/2008 | Jueneman et al. | |
| 2008/0275694 A1 | 11/2008 | Varone | |
| 2008/0288597 A1 | 11/2008 | Christensen et al. | |
| 2008/0301193 A1 | 12/2008 | Massand | |
| 2008/0306894 A1 | 12/2008 | Rajkumar et al. | |
| 2008/0310624 A1 | 12/2008 | Celikkan | |
| 2008/0320316 A1 | 12/2008 | Waldspurger et al. | |
| 2009/0025087 A1 | 1/2009 | Peirson et al. | |
| 2009/0030997 A1 | 1/2009 | Malik | |
| 2009/0034804 A1 | 2/2009 | Cho et al. | |
| 2009/0049132 A1 | 2/2009 | Gutovski | |

(56) References Cited

U.S. PATENT DOCUMENTS

| | | |
|---|---|---|
| 2009/0052778 A1 | 2/2009 | Edgecomb et al. |
| 2009/0064326 A1 | 3/2009 | Goldstein |
| 2009/0083073 A1 | 3/2009 | Mehta et al. |
| 2009/0083384 A1 | 3/2009 | Bhogal et al. |
| 2009/0129002 A1 | 5/2009 | Wu et al. |
| 2009/0164427 A1 | 6/2009 | Shields et al. |
| 2009/0177754 A1 | 7/2009 | Brezina et al. |
| 2009/0178137 A1* | 7/2009 | Branson .............. H04L 63/105 726/22 |
| 2009/0183257 A1* | 7/2009 | Prahalad ............ G06F 21/6218 726/22 |
| 2009/0187567 A1 | 7/2009 | Rolle |
| 2009/0216843 A1 | 8/2009 | Willner et al. |
| 2009/0222450 A1 | 9/2009 | Zigelman |
| 2009/0234863 A1 | 9/2009 | Evans |
| 2009/0241187 A1 | 9/2009 | Troyansky |
| 2009/0271620 A1 | 10/2009 | Sudhakar |
| 2009/0319480 A1 | 12/2009 | Saito |
| 2010/0011077 A1 | 1/2010 | Shkolnikov et al. |
| 2010/0011428 A1 | 1/2010 | Atwood et al. |
| 2010/0017404 A1 | 1/2010 | Banerjee et al. |
| 2010/0017850 A1 | 1/2010 | More et al. |
| 2010/0049807 A1 | 2/2010 | Thompson |
| 2010/0058053 A1 | 3/2010 | Wood et al. |
| 2010/0064004 A1 | 3/2010 | Ravi et al. |
| 2010/0064372 A1 | 3/2010 | More et al. |
| 2010/0070448 A1 | 3/2010 | Omoigui |
| 2010/0076985 A1 | 3/2010 | Egnor |
| 2010/0083230 A1 | 4/2010 | Ramakrishnan |
| 2010/0114985 A1 | 5/2010 | Chaudhary et al. |
| 2010/0114991 A1 | 5/2010 | Chaudhary et al. |
| 2010/0131604 A1 | 5/2010 | Portilla |
| 2010/0146382 A1 | 6/2010 | Abe et al. |
| 2010/0174678 A1 | 7/2010 | Massand |
| 2010/0174761 A1 | 7/2010 | Longobardi et al. |
| 2010/0186062 A1 | 7/2010 | Banti et al. |
| 2010/0217987 A1 | 8/2010 | Shevade |
| 2010/0235763 A1 | 9/2010 | Massand |
| 2010/0241943 A1 | 9/2010 | Massand |
| 2010/0257352 A1 | 10/2010 | Errico |
| 2010/0274765 A1 | 10/2010 | Murphy et al. |
| 2010/0287246 A1 | 11/2010 | Klos et al. |
| 2010/0299727 A1 | 11/2010 | More et al. |
| 2010/0318530 A1 | 12/2010 | Massand |
| 2010/0332428 A1 | 12/2010 | McHenry et al. |
| 2011/0029625 A1 | 2/2011 | Cheng et al. |
| 2011/0035655 A1 | 2/2011 | Heineken |
| 2011/0041165 A1 | 2/2011 | Bowen |
| 2011/0106892 A1 | 5/2011 | Nelson et al. |
| 2011/0107106 A1 | 5/2011 | Morii et al. |
| 2011/0125806 A1 | 5/2011 | Park |
| 2011/0141521 A1 | 6/2011 | Qiao |
| 2011/0145229 A1 | 6/2011 | Vailaya et al. |
| 2011/0197121 A1 | 8/2011 | Kletter |
| 2011/0225646 A1 | 9/2011 | Crawford |
| 2011/0252098 A1 | 10/2011 | Kumar |
| 2011/0252310 A1 | 10/2011 | Rahaman et al. |
| 2011/0264907 A1 | 10/2011 | Betz et al. |
| 2011/0314384 A1 | 12/2011 | Lindgren et al. |
| 2012/0011361 A1 | 1/2012 | Guerrero et al. |
| 2012/0016867 A1 | 1/2012 | Clemm et al. |
| 2012/0030563 A1 | 2/2012 | Lemonik et al. |
| 2012/0036157 A1 | 2/2012 | Rolle |
| 2012/0079267 A1 | 3/2012 | Lee |
| 2012/0079596 A1 | 3/2012 | Thomas et al. |
| 2012/0110092 A1 | 5/2012 | Keohane et al. |
| 2012/0117096 A1 | 5/2012 | Massand |
| 2012/0117644 A1 | 5/2012 | Soeder |
| 2012/0131635 A1 | 5/2012 | Huapaya |
| 2012/0133989 A1 | 5/2012 | Glover |
| 2012/0136862 A1 | 5/2012 | Glover |
| 2012/0136951 A1 | 5/2012 | Mulder |
| 2012/0151316 A1 | 6/2012 | Massand |
| 2012/0173881 A1 | 7/2012 | Trotter |
| 2012/0185511 A1 | 7/2012 | Mansfield et al. |
| 2012/0246115 A1 | 9/2012 | King et al. |
| 2012/0260188 A1 | 10/2012 | Park et al. |
| 2012/0265817 A1 | 10/2012 | Vidalenc et al. |
| 2012/0317239 A1 | 12/2012 | Mulder |
| 2013/0007070 A1 | 1/2013 | Pitschke |
| 2013/0060799 A1 | 3/2013 | Massand |
| 2013/0074195 A1 | 3/2013 | Johnston et al. |
| 2013/0097421 A1 | 4/2013 | Lim |
| 2013/0212707 A1 | 8/2013 | Donahue et al. |
| 2013/0227043 A1 | 8/2013 | Murakami |
| 2013/0227397 A1 | 8/2013 | Tvorun et al. |
| 2014/0032489 A1 | 1/2014 | Hebbar et al. |
| 2014/0115436 A1 | 4/2014 | Beaver et al. |
| 2014/0136497 A1 | 5/2014 | Georgiev et al. |
| 2014/0181223 A1 | 6/2014 | Homsany et al. |
| 2014/0280336 A1 | 9/2014 | Glover |
| 2014/0281872 A1 | 9/2014 | Glover |
| 2015/0026464 A1 | 1/2015 | Hanner et al. |
| 2015/0172058 A1 | 6/2015 | Follis |
| 2016/0350270 A1 | 12/2016 | Nakazawa |

FOREIGN PATENT DOCUMENTS

| | | |
|---|---|---|
| JP | 2007299364 | 11/2007 |
| KR | 1020010078840 | 8/2001 |
| KR | 20040047413 | 6/2004 |
| KR | 1020040047413 | 6/2004 |
| KR | 1020060048686 | 5/2006 |
| KR | 0049518 | 5/2007 |
| KR | 200070049518 | 5/2007 |
| KR | 102008002960 | 4/2008 |
| KR | 1020080029602 | 4/2008 |
| WO | WO0060504 | 10/2000 |
| WO | 2001052473 A1 | 7/2001 |
| WO | 2002101577 A1 | 12/2002 |

OTHER PUBLICATIONS

Final Office Action dated Apr. 17, 2007 for U.S. Appl. No. 10/023,010 filed Dec. 17, 2001, now U.S. Pat. No. 7,496,841.

Final Office Action dated Apr. 17, 2007 for U.S. Appl. No. 10/023,010, filed Dec. 7, 2001, now U.S. Pat. No. 7,496,841.

Final Office Action dated Apr. 17, 2007 in Co-Pending U.S. Appl. No. 10/023,010, filed Dec. 17, 2001, now U.S. Pat. No. 7,496,841

Final Office Action dated Aug. 12, 2011 for U.S. Appl. No. 12/209,096, filed Sep. 11, 2008.

Final Office Action dated Aug. 12, 2011 in Co-Pending U.S. Appl. No. 12/209,096, filed Sep. 11, 2008.

Final Office Action dated Aug. 16, 2013 in co-pending U.S. Appl. No. 13/306,798 of Glover, R.W., filed Nov. 29, 2011.

Final Office Action dated Feb. 1, 2013 in Co-Pending U.S. Appl. No. 12/621,429 of More, S., filed Nov. 18, 2009.

Final Office Action dated Jan. 18, 2013 in Co-Pending U.S. Appl. No. 12/844,818 by Glover, R., filed Jul. 27, 2010.

Final Office Action dated Jan. 18, 2013 in Co-Pending U.S. Appl. No. 12/844,818 of Glover, R., filed Jul. 27, 2010.

Final Office Action dated May 10, 2012 in Co-Pending U.S. Appl. No. 12/209,082, filed Sep. 11, 2008.

Final Office Action dated May 10, 2012 in Co-Pending U.S. Appl. No. 12/209,082.

Final Office Action dated Oct. 21, 2013, in Co-Pending U.S. Appl. No. 13/659,793 by More, S., filed Oct. 24, 2012.

International Search Report of PCT Application No. PCT/IB2002/005821, dated Jan. 30, 2004, 6 pages.

International Search Report of PCT Application No. PCT/2009/064919, dated Jul. 1, 2010, 3 pages.

International Search Report of PCT Application No. PCT/IB2002/005821, dated Jan. 3, 2004, 6 pages.

International Search Report of PCT Application No. PCT/US2009/051313, dated Mar. 3, 2010, 3 pages.

International Search Report of PCT Application No. PCT/US2009/056651, dated Apr. 21, 2010, pp. 1-3.

International Search Report of PCT Application No. PCT/US2009/056668 dated Apr. 16, 2010, pp. 1-9.

(56) References Cited

OTHER PUBLICATIONS

International Search Report of PCT Application No. PCT/US2009/056668, dated Apr. 16, 2010, 9 pages.
International Search Report of PCT Application No. PCT/US2009/064919 dated Jul. 1, 2010, pp. 1-3.
International Search Report of PCT Application No. PCT/US2009/065019 dated Jun. 4, 2010, pp. 1-6.
International Search Report of PCT Application No. PCT/US2009/065019, Jun. 4, 2010, 6 pages.
International Search Report of PCT Application No. PCT/US2010/043345, Apr. 28, 2011, 3 pages.
International Search Report PCT/US2010/043345 dated Apr. 28, 2011, 3 pages.
Jamison, Scott. Essential SharePoint 2010: Overview, Governance, and Planning. Addison-Wesley Professional; 1 edition (Aug. 22, 2010).
Kamouskos et al., Active Electronic Mail, 2002, ACM 6 pages.
Kaushik et al., Email Feedback: A Policy based Approach to Overcoming False Positives, 2005, 10 pages.
Lightfoot, Johnathan and Beckett, Chris. Plain & Simple Microsoft® SharePoint® 2010. O'Reilly Media, Inc. Copyright © 2010.
Londer, Olga and Coventry, Penelope. Step by Step Microsoft® SharePoint® Foundation 2010. Microsoft Press. ISBN: 978-0-7356-2726-0. Copyright © 2011.
M. Eric Johnson et al., The Evolution of the Peer-to-Peer File Sharing Industry and the Security Risks for Users, Jan. 7-10, 2008, IEEE, pp. 1-10.
Mango, "Robust Perceptual Image Hashing Using Feature Points," http://bluecoat-02/?cfru=aHR0cDovL3NpZ25hbC51Y2-UudXRIeGFzLmVkdS9+dmlzaGFs-L2hhc2gtcGFydEkucHM=, 2003.
Mango, "Robust Perceptual Image Hashing Using Feature Points," http://bluecoat-02/?cfru=aHR0cDovL3NpZ25hbC51Y2-UudXRIeGFzLmVkdS9+dmlzaGFs-L2hhcgtcGFydEkucHM=, 2003.
Mango, et al., "Perceptual Image Hashing via Feature Points: Performance Evaluation and Tradeoffs," IEEE Transactions on Image Processing, vol. 15, No. 11, Nov. 2006.
Mango, Robust Perceptual Image Hashing Using Feature Points, http://bluecoat-02/?cfru=aHR0cDovL3NpZ25hbC51Y2Uu-dXRIeGFzLmVkdS9+dmizaGFs-L2hhc2gtcGFydEkucHM=, 2003.
Jain, Pravin. The class of JAVA. Aug. 12, 2010.
Microsoft SharePoint 2010 SDK: Building Block: Files and Documents, msn.microsoft.com (Nov. 1, 2010), https://msdn.microsoft.com/en-us/library/office/ee538269(v=office.14).aspx, (last visited Feb. 27, 2017).
Microsoft SharePoint 2010 SDK: How to: Upload a File to a SharePoint Site from a Local Folders, msn.microsoft.com (Jul. 7, 2010), https://msdn.microsoft.com/en-us/library/office/ms454491(v=office.14).aspx, (last visited Feb. 27, 2017).
Microsoft SharePoint 2010 White Paper , Microsoft.com, www.microsoft.com/downloads/en/details.aspx?familyid=5c562f71-3aa9-46fd-abac-7d381813f2b8 (Sep. 2010), www.microsoft.com/downloads/en/details.aspx?FamilyID=5c562f71-3aa9-46fd-abac-7d381813f2b8 (last visited Feb 27, 2017).
Microsoft, "Microsoft XP, Product Guide", pp. 1-26, 2001.
Microsoft, "Microsoft XP, Product Guide", pp. 1-26.
Monga, "Robust Perceptual Image Hashing Using Feature Points," http://bluecoat-02/?cfru=aHR0cDovL3NpZ25hbC51Y2-UudXRIeGFzLmVkdS9+dmlzaGFs-L2hhc2gtcGFydEkucHM=, 2003.
Monga, "Robust Perceptual Image Hashing using Feature Points," http://bluecoat-02/?cfru=aHR0cDovL3NpZ25hbC51Y-2UudXRIeGFzLmVkdS9+dmlzaGFs- L2hhc2gteGFydEkucHM=, 2003.
Monga, "Robust Perceptual Image Hashing Using Feature Points," http://bluecoat-02/?cfru=aHR0cDovL3NpZ25hbC51Y2U-udXRIeGFzLmVkdS9+dmlzaGFs-L2hhc2gtcGFydEkucHM=, 2003.
Monga, et al., "Perceptual Image Hashing Via Feature Points: Performance Evaluation and Tradeoffs," IEEE Tranactions on Image Processing, vol. 15, No. 11, Nov. 2006.
Monga, et al., "Perceptual Image Hashing Via Feature Points: Performance Evaluation and Tradeoffs," IEEE Transactions on Image Processing, vol. 15, No. 11, Nov. 2006.
Monga, V. et al., Perceptual image hashing via feature points: performance evaluation and tradeoffs IEEE Transactions on Image Processing, 15 (11) (2006), pp. 3453-3466.
Nathaniel S. Good et al., Usability and privacy: a study of KaZaA P2P file-sharing, Apr. 5-10, 2003, ACM, vol. No. 5, Issue No. 1, pp. 137-144.
Non-Final Office Action Apr. 27, 2012 in Co-Pending U.S. Appl. No. 12/275,185, filed Nov. 20, 2008.
Non-final office action issued for U.S. Appl. No. 13/799,067 dated Oct. 30, 2014.
Non-Final Office Action dated Apr. 26, 2013 in Co-Pending U.S. Appl. No. 13/659,817 by More, S., filed Oct. 24, 2012.
Non-Final Office Action dated Apr. 26, 2013 in Co-Pending U.S. Appl. No. 13/659,817 of More, S., filed Oct. 24, 2012.
Non-Final Office Action dated Apr. 27, 2012 in Co-Pending U.S. Appl. No. 12/275,185 of More, S., filed Nov. 20, 2008.
Non-Final Office Action dated Apr. 27, 2012 in Co-Pending U.S. Appl. No. 12/275,185, filed Nov. 20, 2008.
Non-Final Office Action dated Aug. 1, 2012 in Co-Pending U.S. Appl. No. 12/621,429, filed Nov. 18, 2009.
Non-Final Office Action dated Aug. 1, 2012 in Co-Pending U.S. Appl. No. 12/621,429 of More, S., filed Nov. 18, 2009.
Non-Final Office Action dated Aug. 13, 2013 in co-pending U.S. Appl. No. 13/306,819 by Glover, R.W., filed Nov. 29, 2011.
Non-Final Office Action dated Dec. 22, 2011 in Co-Pending U.S. Appl. No. 12/209,082.
Non-Final Office Action dated Dec. 6, 2012 in co-pending U.S. Appl. No. 13/306,798, filed Nov. 29, 2011.
Non-Final Office Action dated Jan. 9, 2012 in Co-Pending U.S. Appl. No. 12/177,043, filed Jul. 21, 2008.
Non-Final Office Action dated Mar. 11, 2011 in Co-Pending U.S. Appl. No. 12/209,096, filed Sep. 11, 2008.
Non-Final Office Action dated Mar. 16, 2006 for U.S. Appl. No. 10/023,010, filed Dec. 17, 2001, now U.S. Pat. No. 7,496,841.
Non-Final Office Action dated Mar. 16, 2006 in Co-Pending U.S. Appl. No. 10/023,010, filed Dec. 17, 2001, now U.S. Pat. No. 7,496,841.
Non-Final Office Action dated Mar. 18, 2013 in Co-Pending U.S. Appl. No. 13/659,793 by More, S., filed Oct. 24, 2012.
Non-Final Office Action dated Mar. 18, 2013 in Co-Pending U.S. Appl. No. 13/659,793 of More, S., filed Oct. 24, 2012.
Non-Final Office Action dated Mar. 20, 2006 in Co-pending U.S. Appl. No. 10/136,733 filed Apr. 30, 2002.
Non-Final Office Action dated Mar. 20, 2006 in U.S. Appl. No. 10/136,733, filed Apr. 30, 2002.
Non-Final Office Action dated May 17, 2013 in co-pending U.S. Appl. No. 13/306,765 by Mulder, S. P. M, filed Nov. 29, 2011.
Non-Final Office Action dated May 7, 2008 in Co-Pending U.S. Appl. No. 10/023,010, filed Dec. 17, 2001.
Non-Final Office Action dated May 7, 2008 in Co-Pending U.S. Appl. No. 10/023,010, filed Dec. 17, 2001, now U.S. Pat. No. 7,496,841.
"3BClean".
"EzClean—Metadata removal utility for Microsoft Office".
"MIMEsweeper Solutions".
"CS MAILsweeper™ 4.3 for SMTP" by Clearswift Ltd (© 2002).
"EzClean—New Features—version 3.3".
"EzClean 3.2—New Features".
"EzClean FAQ".
"How do I make sure that there is no embarrassing Metadata in any documents that I attach to e-mails? ezClean makes it easy!"
"Lotus Announces cc:Mail for The World Wide Web; Provides EasyAccess to E-Mail Via the Web".
"Middleboxes: Taxonomy and Issues," Internet Engineering TaskForce (IETF), RFC 3234 (Feb. 2002).
"MIME (Multipurpose Internet Mail Extensions): Mechanisms forSpecifying and Describing the Format of Internet Message Bodies," Internet Engineering Task Force (IETF), RFC 1341 (Jun. 1992).

(56) References Cited

OTHER PUBLICATIONS

"Think Your Deletions are Gone Forever? Think Again! ezClean Makes Metadata Removal Easy!"
3B Clean: What is the Problem? 3B is the solution.
3B Transform from 2005.
3BOpen Doc Making StarOffice and OpenOffice.org a viable option.
3BOpenDoc—Convert documents to and from OSF.
Advisory Action dated Apr. 12, 2013, in Co-Pending U.S. Appl. No. 12/621,429 by More, S., filed Nov. 18, 2009.
Advisory Action dated Apr. 12, 2013, in Co-Pending U.S. Appl. No. 12/621,429 of More, S., filed Nov. 18, 2009.
Advisory Action dated Nov. 1, 2013, in Co-Pending U.S. Appl. No. 13/659,793 by More, S., filed Oct. 24, 2012.
Bettenburg et al., An Empirical Study on the Risks of Using Off-the-Shelf Techniques for Processing Mailing List Data, 2009, IEEE 4 pages.
Bindu et al., Spam War: Battling Ham against Spam, 2011 IEEE 6 pages.
Bitform Extract SDK 2005.1.
Bobba et al. Attribute-Based Messaging: Access Control and Confidentiality, 2010, ACM 35 pages.
Cawood, Stephen. How to Do Everything™ Microsoft® SharePoint® 2010. McGraw-Hill, 2010. ISBN 978-0-07-174367-9 (pbk). Copyright © 2010.
Chen et al., Online Detection and Prevention of Phishing Attacks, 2006, IEEE 7 pages.
Co-pending U.S. Appl. No. 10/023,010, filed Dec. 17, 2001.
Co-pending U.S. Appl. No. 10/136,733, filed Apr. 30, 2002.
Co-pending U.S. Appl. No. 12/177,043, filed Jul. 21, 2008.
Co-pending U.S. Appl. No. 12/209,082, filed Sep. 11, 2008.
Co-pending U.S. Appl. No. 12/209,096, filed Sep. 11, 2008.
Co-pending U.S. Appl. No. 12/275,185, filed Nov. 20, 2008.
Co-pending U.S. Appl. No. 12/621,429, filed Nov. 18, 2009.
Co-pending U.S. Appl. No. 12/1844,818, filed Jul. 27, 2010.
Co-pending U.S. Appl. No. 12/844,818, filed Jul. 27, 2010.
Co-pending U.S. Appl. No. 13/306,765, filed Nov. 29, 2011.
Co-pending U.S. Appl. No. 13/306,798, filed Nov. 29, 2011.
Co-pending U.S. Appl. No. 13/306,819, filed Nov. 29, 2011.
Co-pending U.S. Appl. No. 13/620,364, filed Sep. 14, 2012.
Co-Pending U.S. Appl. No. 13/659,793, filed Oct. 24, 2012.
Co-Pending U.S. Appl. No. 13/659,817, filed Oct. 24, 2012.
Dominik Grolimund et al., Cryptree: A Folder Tree Structure for Cryptographic File Systems, Oct. 2-4, 2006, IEEE, pp. 189-198.
EZclean version 3.3 Installation Guide and Admin Manual.
EzClean version 3.3 Integration Guide for use with CS MailSweeper for SMTP.
Stolfo et al., AMT?MET: Systems for Modeling and Detecting Errant Email. 2003, IEEE 6 pages.
Sujoy Roy, et al., "Robust Hash for Detecting and Localizing Image Tampering," Image Processing, 2007, ICIP 2007, IEEE International Conference on, vol. 6, No., pp. V1-117-V1-120, Sep. 16, 2007-Oct. 19, 2007.
Sujoy Roy; Qibin Sun; , "Robust Hash for Detecting and Localizing Image Tampering," Image Processing, 2007. ICIP 2007. IEEE International Conference on , vol. 6, No., pp. VI-117-VI-120, Sep. 16, 2007-Oct. 19, 2007.
Tsai, et al., "A document Workspace for Collaboration and Annotation based on XML Technology", Department of Electrical Engineering, 2001, pp. 165-172.
Tsai, et al., "A Document Workspace for Collaboration and Annotation based on XML Technology", IEEE, 2000, pp. 165-172.
Tuklakov, et al., "Symmetric Hash Functions for Fingerprint Minutiae," International Workshop on Pattern Recognition for Crime Prevention, Security and Surveillance, Bath U.K., Oct. 2, 2005, pp. 30-38.
Tulyakov et al, Symmetric Hash Functions for Fingerprint Minutiae, ICAPR 2005, LNCS 3687, pp. 30-38, 2005.
Tulyakov et al. "Symmetric Hash Functions for Fingerprint Minutiae." International Workshop on Patter Recognition for Crime Prevention, Security and Surveillance, Bath U.K., Oct. 2, 2005, pp. 30-38.
Tulyakov, et al., "Symmetric Hash Functions for Fingerprint Minutiae," International Workshop on Pattern Recognition for Crime Prevention, Security and Surveillance, Bath U.K., Oct. 2, 2005, pp. 30-38.
U.S. Appl. No. 13/789,104, filed Mar. 7, 2013, Gofman.
User Permissions and Permission Levels (SharePoint Foundation 2010)(technet.microsoft.com) (Jan. 4, 2011), https://technet.microsoft.com/en-us/library/cc288074(v=office.14).aspx (last visited Feb. 27, 2017).
V Monga, B.L. Evans Perceptual image hashing via feature points: performance evaluation and tradeoffs IEEE Transactions on Image Processing, 15 (11) (2006), pp. 3453-3466.
Weiss et al., Lightweight document matching for help-desk applications, In: Intelligent Systems and their Applications, IEEE, Vo. 15, Issue:2, pp. 57-61, ISSN 1094-7167, 2000.
Wells et al., "Groupware & Collaboration Support", www.objs.com/survey/groupwar.htm, Aug. 30, 2001, 10 pages.
Written Opinion of PCT Application No. PCT/US2009/051313, dated Mar. 3, 2010, 3 pages.
Written Opinion of PCT Application No. PCT/US2009/051313, dated Mar. 3, 2010, 4 pages.
Written Opinion PCT Application No. PCT/2009/064919, dated Jul. 1, 2010, 4 pages.
Written Opinion PCT Application No. PCT/US2009/056651, dated Apr. 21, 2010, pp. 1-5.
Written Opinion PCT Application No. PCT/US2009/056668 dated Apr. 16, 2010 pp. 1-4.
Written Opinion PCT Application No. PCT/US2009/056668, dated Apr. 16, 2010, 4 pages
Written Opinion PCT Application No. PCT/US2009/064919 dated Jul. 1, 2010, pp. 1-4 pages.
Written Opinion PCT Application No. PCT/US2009/064919 dated Jul. 1, 2010, pp. 1-4.
Written Opinion PCT Application No. PCT/US2009/065019 dated Jun. 4, 2010, p. 1-5.
Written Opinion PCT Application No. PCT/US2009/065019 dated Jun. 4, 2010, pp. 1-5.
Written Opinion PCT Application No. PCT/US2009/065019, dated Jun. 4, 2010, 5 pages.
Written Opinion PCT Application No. PCT/US2010/043345 dated Apr. 28, 2011, 4 pages.
Written Opinion PCT/US2009/056651 dated Apr. 21, 2010, pp. 1-5.
XP-002257904, "Workshare Debuts Synergy", 2003, 3 pages.
Xuefeng Liang; et al., "Fingerprint Matching Using Minutia Polygons," Pattern Recognition, 2006, ICPR 2006, 18th International Conference on, vol. 1, No., pp. 1046-1049.
Xuefeng Liang; et al., "Fingerprint Matching Using Minutia Polygons," Pattern Recognition, 2006, ICPR 2006, 18th International Confernce on, vol. 1, No., pp. 1046-1049.
Xuefeng Liang; Tetsuo Asano; , "Fingerprint Matching Using Minutia Polygons," Pattern Recognition, 2006. ICPR 2006. 18th International Conference on , vol. 1, No., pp. 1046-1049.
Yung et al, Generating Robust Digital Signature for Image/Video Authentication, Multimedia and Security Workshop at ACM Multimedia '98, Bristol, U.K., Sep. 1998.
Non-Final Office Action dated Sep. 19, 2011 for U.S. Appl. No. 12/177,043, filed Jul. 21, 2008.
Non-Final Office Action dated Sep. 19, 2011 in Co-Pending U.S. Appl. No. 12/177,043, filed Jul. 21, 2008.
Non-Final Office Action dated Sep. 19, 2012 in Co-Pending U.S. Appl. No. 12/844,818 by Glover, R., filed Jul. 27, 2010.
Non-Final Office Action dated Sep. 19, 2012 in Co-Pending U.S. Appl. No. 12/844,818 of Glover, R., filed Jul. 27, 2010.
Notice of Allowance dated Aug. 19, 2012 in Co-Pending U.S. Appl. No. 12/177,043, filed Jul. 21, 2008.
Notice of Allowance dated Jul. 8, 2013 in Co-Pending U.S. Appl. No. 12/209,082 by S. More et al., filed Sep. 11, 2008.
Notice of Allowance dated Jun. 26, 2012 in Co-Pending U.S. Appl. No. 12/275,185, filed Nov. 20, 2008.

(56) References Cited

OTHER PUBLICATIONS

Notice of Allowance dated Mar. 13, 2013 in Co-Pending U.S. Appl. No. 12/844,818 by Glover, R., filed Jul. 27, 2010.
Notice of Allowance dated Mar. 13, 2013 in Co-Pending U.S. Appl. No. 12/844,818 of Glover, R., filed Jul. 27, 2010.
Notice of Allowance dated Oct. 2, 2012, in Co-Pending U.S. Appl. No. 12/275,185 by More, S., filed Nov. 20, 2008.
Notice of Allowance dated Oct. 2, 2012, in Co-Pending U.S. Appl. No. 12/275,185 of More, S., filed Nov. 20, 2008.
Notice of Allowance dated Oct. 24, 2008 in Co-pending U.S. Appl. No. 10/023,010, filed Dec. 17, 2001.
Notice of Allowance dated Oct. 24, 2008 in Co-Pending U.S. Appl. No. 10/023,010, filed Dec. 17, 2001, now U.S. Pat. No. 7,496,841.
Notice of Allowance dated Sep. 25, 2013, in Co-Pending U.S. Appl. No. 13/659,817 by More, S., filed Oct. 24, 2012.
Office Web Apps Overview (Installed on SharePoint 2010 Products), Technet.Microsoft.com (Jun. 11, 2010), https://technet.microsoft.com/en-us/library/ff431685(v=office.14).aspx, (last visited Feb. 27, 2017).
Pattison,Ted et al. Inside Microsoft® SharePoint® 2010. Critical Path Training, LLC © 2011.
PC Magazine "Pure Intranets: Real-Time Internet Collaboration", Aug. 30, 2001.
PC Magazine "Pure Intranets: Real-Time Internet Collaboration", http://www.zdnet.com/pcmag/featuresgroupware/gpwst.htm, Aug. 30, 2001, 2 pages.
Restriction Requirement Jun. 30, 2006 for U.S. Appl. No. 10/136,733, filed Apr. 30, 2002.
Restriction Requirement dated Feb. 14, 2005 for U.S. Appl. No. 10/023,010, filed Dec. 17, 2001, now U.S. Pat. No. 7,496,841.
Restriction Requirement dated Feb. 14, 2005 in U.S. Appl. No. 10/023,010, filed Dec. 17, 2001, now U.S. Pat. No. 7,496,841.
Restriction Requirement dated Feb. 5, 2008 for U.S. Appl. No. 10/023,010, filed Dec. 17, 2001, now U.S. Pat. No. 7,496,841.
Restriction Requirement dated Feb. 5, 2008 in Co-Pending U.S. Appl. No. 10/023,010, filed Dec. 17, 2001, now U.S. Pat. No. 7,496,841.
Restriction Requirement dated Jun. 30, 2006 for U.S. Appl. No. 10/136,733, filed Apr. 30, 2002.
Restriction Requirement dated Jun. 30, 2006 in U.S. Appl. No. 10/136,733, filed Apr. 30, 2002.
Roussev, et al., "Integrating XML and Object-based Programming for Distributed Collaboration", IEEE, 2000, pp. 254-259.
Sahil Malik. Microsoft SharePoint 2010: Building Solutions for SharePoint 2010 . Apress; 1st ed. edition (Jun. 7, 2010).
Silver, Michael A.; MacDonald, Neil. Plan to Deal with Metadata Issues with Windows Vista. Gartner, Inc.. Dec. 21, 2005.ID No. G00136321.
Simple Mail Transfer Protocol, Internet Engineering Task Force(IETF), RFC 821 (Aug. 1982).
Stephen Voida et al., Share and Share Alike: Exploring the User Interface Affordances of File Sharing, Apr. 22-27, 2006, ACM, pp. 1-10.
Workshare Ltd. Workshare Protect 4.5 Admin Guide, (c) 2006.
Classification Definitions Class 715, Data Processing: Presentation Processing of Document, Operator Interface Processing, and Screen Saver Display Processing; Feb. 2011; USPTO.gov, pp. 1-33.

\* cited by examiner

METHODS AND SYSTEMS FOR PREVENTING TRANSMISSION OF SENSITIVE DATA FROM A REMOTE COMPUTER DEVICE

PRIORITY CLAIM

The application claims priority as a continuation of U.S. patent application Ser. No. 14/745,656 filed on Jun. 22, 2015, and as a continuation to U.S. patent application Ser. No. 12/621,429 filed on Nov. 18, 2009, now U.S. Pat. No. 9,092,636 which issued on Jul. 28, 2015, which is a non-provisional continuation of U.S. Provisional Application No. 61/115,633, entitled, "METHODS AND SYSTEMS FOR EXACT DATA MATCH FILTERING," filed on Nov. 18, 2008, all of which are herein incorporated by reference in their entireties.

This application is also related to U.S. patent application Ser. No. 12/177,043, entitled "METHODS AND SYSTEMS TO FINGERPRINT TEXTUAL INFORMATION USING WORD RUNS," filed Jul. 21, 2008, issued as U.S. Pat. No. 8,286,171 on Oct. 9, 2012 and to U.S. patent application Ser. No. 12/209,082, entitled "METHODS AND SYSTEMS FOR PROTECT AGENTS USING DISTRIBUTED LIGHTWEIGHT FINGERPRINTS," filed Sep. 11, 2008, issued as U.S. Pat. No. 8,555,080 on Oct. 8, 2013, both of which are incorporated by reference as if fully set forth herein.

FIELD OF THE INVENTION

The present invention relates to information security and more specifically relates to systems and methods for detecting and preventing unauthorized disclosure of secure information. Furthermore, the present invention pertains to methods and systems for exact data match filtering for structured data.

BACKGROUND OF THE INVENTION

With the rapid increase and advances in digital documentation services and document management systems, organizations are increasingly storing important, confidential, and secure information in the form of digital documents. Unauthorized dissemination of this information, either by accident or by wanton means, presents serious security risks to these organizations. Therefore, it is imperative for the organizations to protect such secure information and detect and react to any secure information from being disclosed beyond the perimeters of the organization.

Additionally, the organizations face the challenge of categorizing and maintaining the large corpus of digital information across potentially thousands of data stores, content management systems, end-user desktops, etc. It is therefore important to the organization to be able to store concise and lightweight versions of fingerprints corresponding to the vast amounts of image data. Furthermore, the organizations face the challenge of categorizing and maintaining the large corpus of digital information across potentially thousands of data stores, content management systems, end-user desktops, etc. One solution to this challenge is to generate fingerprints from all of the digital information that the organization seeks to protect. These fingerprints tersely and securely represent the organization's secure data, and can be maintained in a database for later verification against the information that a user desires to disclose. When the user wishes to disclose any information outside of the organization, fingerprints are generated for the user's information, and these fingerprints are compared against the fingerprints stored in the fingerprint database. If the fingerprints of the user's information matches with fingerprints contained in the fingerprint server, suitable security actions are performed.

However, the user has at his disposal myriad options to disclose the information outside of the organization's protected environment. For example, the user could copy the digital information from his computer to a removable storage medium (e.g., a floppy drive, a USB storage device, etc.), or the user could email the information from his computer through the organization's email server, or the user could print out the information by sending a print request through the organization's print server, etc.

Additionally, in many organizations, sensitive data is stored in databases, including account numbers, patient IDs, and other well-formed, or "structured", data. The amount of this structured data can be enormous and ease of unwanted distribution across the egress points creates security problems for organizations.

The exact data match problem can be thought of as a massive, multi-keyword search problem. Methods for exact keyword match include Wu-Manber and Aho-Corasick. However, these methods are disadvantageous because they do not scale beyond several thousand keywords in space or time.

Full blown databases can be employed for exact data matches, but they do not scale down to Agents residing on Laptops. There are also security concerns with duplicating all the confidential cell data within an organization directly.

A more general approach can be taken where the pattern of each category of structured data is inferred and searched via regular expressions or a more complex entity extraction technique. However, without the actual values being protected, this approach would lead to many false positives.

SUMMARY OF THE INVENTION

Introduced here and described below in detail are methods and systems for securing a computer system from transmission of sensitive data. In one embodiment, an organization's digital information is scanned to retrieve "sensitive" candidate entities. These sensitive entities correspond to structured data words (e.g., social security numbers, patient IDs, etc.) that the organization desires to protect from unauthorized disclosure. In some instances, the candidate entities are identified on the basis of word-patterns and/or heuristic rules. The identified candidate entities are optionally converted to a canonical format to enable the data match inspection engine to be impervious to changes in character encoding, digital format, etc. The candidate entities are then stored as registered entities in an entity database. In some instances, the entity database is a lightweight entity database (LWED) that supports a compressed version of the registered entities. The database compression can be achieved by storing the candidate entities in a data structure that supports membership query while introducing a small error of false positives in the membership query (e.g., a Bloom filter). In some instances, the entity database is a global entity database (GED) that is stored in association with a remote server. The GED includes an uncompressed version of the registered entities (or corresponding hash-values of the entities), and also includes metadata information associated with each of the registered entities.

Protect agents are installed across several egress points (laptop, mail server, etc.) to monitor information being disclosed by a user. The protect agents receive digital information (e.g., textual information) that a user wishes to disclose using the egress point, and identifies candidate entities from the textual information. In one embodiment, the protect agent looks up the candidate entities against registered entities stored in the LWED. If the protect agent detects any matching candidate entities, the protect agent initiates an appropriate security action. In some embodiments, the protect agent communicates with a remote GED server (containing the GED). In such embodiments, the protect agent transmits the matching candidate entities to the GED server, where the candidate entities are again matched against the registered entities in the GED. The results of the GED comparison eliminate or reduce any false positives that may have resulted from the comparison of the candidate entities against the LWED. In some instances, the GED also supplies the protect agent with metadata associated with the matching candidate entities. The metadata information is useful in initiating various types of security actions.

BRIEF DESCRIPTION OF THE DRAWINGS

One or more embodiments of the present invention are illustrated by way of example and not limitation in the figures of the accompanying drawings, in which like references indicate similar elements.

DETAILED DESCRIPTION OF THE INVENTION

The present invention may be embodied in several forms and manners. The description provided below and the drawings show exemplary embodiments of the invention. Those of skill in the art will appreciate that the invention may be embodied in other forms and manners not shown below. It is understood that the use of relational terms, if any, such as first, second, top and bottom, and the like are used solely for distinguishing one entity or action from another, without necessarily requiring or implying any such actual relationship or order between such entities or actions. References in this specification to "an embodiment", "one embodiment", or the like, mean that the particular feature, structure or characteristic being described is included in at least one embodiment of the present invention. Occurrences of such phrases in this specification do not necessarily all refer to the same embodiment.

Figure 1A:
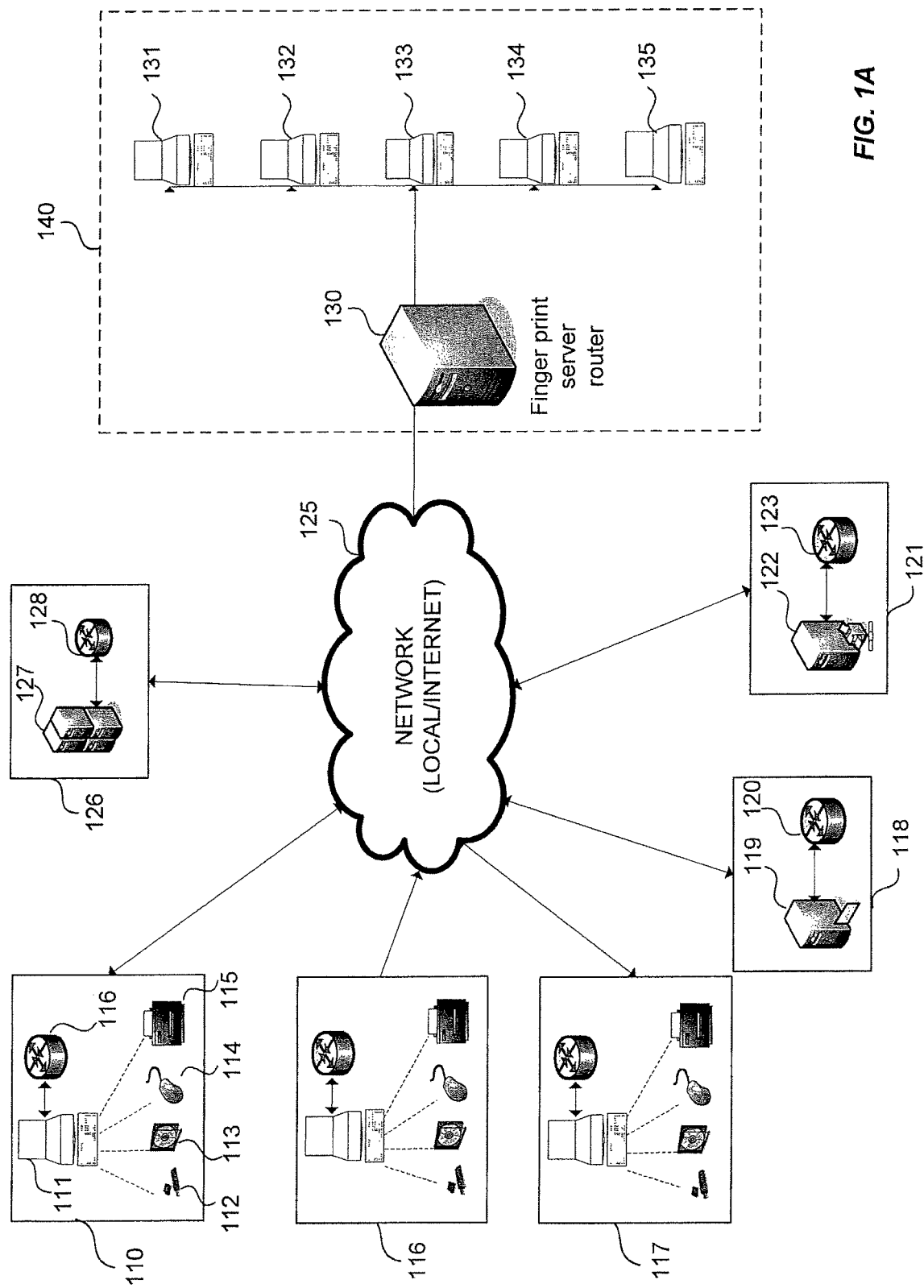
FIG. 1A illustrates an example of an overall setup to implement protect agents for exact data match filtering.

FIG. 1A illustrates an example of an overall setup to implement protect agents for exact data match filtering. One of the means by which a user can disclose digital information outside of the organization's security perimeter is by disclosing the information through his remote computer 110. Examples of such a remote computer include a desktop computer, a laptop, a PDA, a smart phone, a tablet or any such device that allows a user to access the organization's information. In one embodiment, the remote computer 110 is connected to a network 125. Here, the computing system 110 comprises the remote computer 111 through which the user accesses the organization's secure information. The user would be able to transfer information outside of the organization by transferring the information to any medium connected to the remote computer or transmitting information out of the remote computer to a network destination other than a network address within the organization's security perimeter.

Such points (i.e., computer hardware) through which information can be transferred outside of the organization's protected environment are called egress points. Examples of transferring data at egress points include copying the information from the computer to a CD disk 112 or any other optical storage medium, copying the information to a floppy drive 113 or any other tape medium, copying the information to a USB key 114 or other flash based storage medium, transferring the information by printing the information using a printer 115, copying information to the clipboard 115a of the local operating system, etc. An egress point can also be the network card of the remote computer when it is used to transmit the information onto the network to a network address outside the secure perimeter of the organization's system. In such an event, all the information that is transmitted through the computer 111 needs to be monitored to ensure that secure or sensitive information does not get transferred.

The information to be monitored may include digital textual data, image data, multimedia data etc. Such digital information can be monitored by using, for example, fingerprinting technology to be enable registration and inspection of a large corpus of data. Examples of such fingerprinting technology are described in detail in related applications U.S. application Ser. No. 12/177,043, entitled "METHODS AND SYSTEMS TO FINGERPRINT TEXTUAL INFORMATION USING WORD RUNS," filed Jul. 21, 2008, and U.S. application Ser. No. 12/209,082, entitled "METHODS AND SYSTEMS FOR PROTECT AGENTS USING DISTRIBUTED LIGHTWEIGHT FINGERPRINTS," filed Sep. 11, 2008, both of which are incorporated by reference in their entireties herein. The fingerprinting technology described in the above applications uses various techniques to protect the large corpus an organization's confidential information. In one example, the fingerprinting technology detects sentences, or even paragraphs, in original or derivative forms, and prevents such textual information from being disclosed. However, such fingerprinting technology may not be an effective tool for protection of "exact data words." An "exact data word," as described herein, refers to any combination of characters (e.g., alphabets, numbers, symbols, etc.) that form a structured word. Such exact data words may exist, for example, in the form of patient IDs in a hospital database, social-security numbers, or employees' date-of-birth information, phone numbers, etc. In some instances, such exact data words have a well-structured format or pattern (e.g., social security numbers have a pattern that includes seven numerical characters and two "-" symbols separating groups of the numerical characters). These exact data words may be spread across various documents that constitute the organization's digital information (e.g., in textual data, embedded in images, etc.). When such exact data words are confidential they need to be protected from unauthorized disclosure. To achieve this, the following sections describe techniques for identifying such exact data words, and preventing the exact data words from unauthorized disclosure through any of the egress points.

Returning to FIG. 1A, the various egress points of the computer 111 are monitored to detect any activity that purports to disclose information through the egress points. A software agent, called the protect agent 116, is run on the computer 111 to monitor activity at the egress points (112, 113, 114, 115, 115*a*) associated with the computer 111. If the organization supports more than one computer system, each of these computer systems (110, 116, 117, 118) have protect agents installed on them to ensure that the activity on each of the computer systems is monitored. In one embodiment, the protect agent 116 is a set of computer instructions or a computer implemented program available on a memory location (e.g., on a magnetic tape drive, a flash memory drive, etc.) at the site of the protect agent 116. In some instances, the protect agent can be implemented by using programmable circuitry programmed by software and/or firmware, or by using special-purpose hardwired circuitry, or by using a combination of such embodiments.

In addition to being installed in every computer system (110, 116, 117, 118) in the network, the protect agents are also installed on other vulnerable egress points across the organization. One example of such a vulnerable egress point includes one or more email server systems 118 connected to the network. The email server 119 handles and routes the emails sent out and received by the organization. The protect agent 120 installed on the email server 119 monitors the emails desired to be sent out of the organization through the email server. Another example of a vulnerable egress point could be a print server 121 connected to the organization's network. A protect agent 123 connected to the print server 122 monitors print jobs sent by the users to the printers connected to the network.

Additional examples of vulnerable egress points include network appliance systems 126. Here, a protect agent 128 is installed in each network appliance 127 to ensure that information disclosed through a particular network appliance 127 is monitored. Examples of using network appliances 126 to transfer data include sharing of data over a network share medium, data transferred at the socket or TCP layer of the network, etc. It is understood that in addition to these examples, the egress points also include other porous environments through which information can be disclosed by the user beyond the secure environment of the organization.

In one embodiment, the there is a computer system secured against unauthorized external communications of data items from an egress point, said system comprising:

a central server;

at least one remote devices connected to the central server by a data network where the remote devices are authorized to communicate with the central server using the data network connection, said remote device comprised of a local data scanning component, where the data scanning component is configured to inspect an outgoing message stored on the remote device to determine if the outgoing message is addressed to a location accessed through the egress point and in dependence on such determination and prior to transmission of the outgoing message, scan the data comprising the message using a first at least one security rules stored locally on the remote device and in the case of triggering said at least one security rules, transmit a portion of the outgoing message data to the central server;

where the central server is further comprised of a security component that is adapted to receive the transmitted portion of the outgoing message, determine a security action by scanning the received portion of the outgoing message using a second at least one security rule stored on the central server and transmit a command encoding the determined security action to the remote device, where the remote device is further configured to execute the determined security action on the outgoing message prior to its transmission through the egress point.

In another embodiment, the at least one security rule is a data structure encoding a logical test whether a predetermined set of words are present within the outgoing message.

In yet another embodiment, the at least one security rule is a data structure encoding a logical test whether a subset of a predetermined set of words are present within the outgoing message, said subset being selected by utilizing a heuristic engine that applies a heuristic word selection rule.

In yet another embodiment, the heuristic selection rule includes one or more of:

skipping over a first word from the plurality of words when the first word matches a first stop word of a plurality of stop words;

skipping over a second word from the plurality of words when the second word has a word-length that is shorter than a first word-length of a shortest registered entity of the plurality of compressed registered entities; or skipping over a third word from the plurality of words when the third word has a word-length that is longer than a second word-length of the longest registered entity of the plurality of compressed registered entities.

In yet another embodiment, the local scanning component is further configured to convert a portion of the outgoing message into a canonical format prior to running the scan, wherein the canonical format causes the local scanning component to be impervious to differences in digital format and character encoding.

In yet another embodiment, the at least one locally stored security rule correspond to at least one corresponding entity words that are to be secured from unauthorized transmission.

In yet another embodiment, the security action includes one or more of:

preventing the portion of the outgoing message from being disclosed through the first egress point;

logging transmission of the portion of the outgoing message as a security violation;

requiring a password from a user to allow the portion of the outgoing message to be disclosed;

blocking access by a user who transmitted the portion of the outgoing message to a user of the remote device;

sending out a security alert; or integration of the portion of the outgoing message with rights management information.

In yet another embodiment, the local data scanning component is further configured to scan the outgoing message using the local security rules to identify at least one word of a predetermined set of words where the portion of the outgoing message transmitted to the central server is the set of at least one identified words; wherein the security component of the central server is further configured to reduce a possibility that the identified one or more matching candidate entities are false positives, and wherein the central server is further configured to automatically generate an acknowledgement message encoding whether each of the at least one words matches at least one corresponding security rule stored on the central server, transmit the acknowledgement message to the remote device; and wherein the remote device is further configured to perform the security action on the outgoing message before the outgoing message is transmitted through the egress point.

In yet another embodiment, the at least one security rule stored on the central server encodes a logical condition dependent on one or more of: an entity type associated with the portion; a location of the portion within a particular document; a data type associated with the portion or an origin information of a particular document.

In yet another embodiment, the security action includes one or more of:

preventing the portion from being transmitted through the first egress point;

logging transmission of the portion as a security violation;

requiring a password from a user to allow the portion to be disclosed;

blocking access by a user who transmitted the portion to a user of the remote device;

sending out a security alert; or integration of the portion with rights management information.

In one embodiment, a lightweight entity database (LWED) 118 is provided locally at the site at which each of the protect agents is installed (e.g., the remote computer, for example, the user's desktop/laptop computer, smartphone, one of the network appliances, etc.). As will be explained in detail below, in one embodiment, the LWED is a compressed database that includes registered entities. An entity, as described herein, refers to an exact data word. A registration process scans the organization's digital information to extract entities (i.e., exact data words that need to be protected against unauthorized disclosure) and registers them in a database. The entities registered into such a database are referred to as "registered entities." As will be described in detail below, the database may be a global database (GED), or an LWED (which is, for example, a compressed version of the GED).

In one embodiment, at least one redundant copy of the LWED is stored locally at the site of each protect agent 116 such that the protect agent can access or communicate with the LWED even when the protect agent is not connected to any network. For example, a protect agent 116 implemented on a user's laptop computer monitors the activity at all egress points of the user's laptop computer (e.g., 112, 113, 114, etc.) and prevents unauthorized disclosure of information from the laptop computer through the egress points, even if the laptop computer is not connected to any network (e.g., the organization's local network, the public Internet, etc.).

In one illustrative embodiment, the computer systems and all other systems representing egress points (the egress point systems) are centrally connected to a network 125. In one embodiment, the network includes a local network. This includes a network that is managed and maintained locally by the organization. In another embodiment, the network could also be the internet. In the case of the Internet, each of the egress point systems could be directly and individually connected to the internet, or could be connected to a local network or a cluster of local networks, with each of the local networks communicating with each other through the internet. Other combinations of the egress point systems within the local network and the internet are possible and such combinations will be apparent to a person of skill in the art.

In one embodiment where the egress point systems are connected to the network, one or more entity servers (e.g., 131, 132, 133, 134, 135) are connected to the network. The entity server (e.g., 131) is coupled to the GED (that holds the uncompressed version of the registered entities). In one example, each of the entity servers (131, 132, 133, 134, 135) is connected directly to the network. In another example, each of the entity servers (131, 132, 133, 134, 135) is connected to an entity server router 130.

The functions of the entity server router 130 may include, for example, routing requests from a protect agent 116 to the least busy entity server, collecting performance statistics of the entity servers (131, 132, 133, 134, 135) to determine the load on each entity server (such that a request from a protect agent can be routed to the least busy entity server, synchronization and version control of the GED at each entity server, etc.).

In one embodiment, the entity servers (131, 132, 133, 134, 135) could be located at different geographical locations (not shown in FIG. 1A) and connect to the entity server router 130 through the network. This distributed model would allow organizations to run protect agents with minimal performance lag across geographically diverse locations, such that information from the protect agents are routed to the most optimal entity server. It should be noted that the entity server router is not imperative to maintaining a distributed entity server array. Any other means known in the art through which a distributed network can be achieved can be employed in the place of the entity server router 130.

In the case of the public internet, the entity servers (e.g., 131) function as hosted entity servers. A hosted entity server is publicly accessible over the internet. One advantage of using a hosted entity server is that an organization does not have to deploy and manage one or more server appliances within its networks (for the purpose of holding a GED). Some small organizations may not even have infrastructure to maintain a network and host an entity server, but may still require their secure information to be protected. In such cases, the support and manageability of the entity server can be done by even a third party provider that provides the service of a hosted entity server.

A provider offering a hosted registered entity service can also support multi-tenancy services, whereby the provider shares the hosted entity server's resources across different organizations. In one embodiment, this would allow GEDs for multiple organizations to reside on the same server.

It is emphasized that the network 125 and entity servers 140 depicted in FIG. 1A are for illustrative purposes only, and that a network 125 or an entity server setup 140 is not essential for a protect agent 116 to perform an entity lookup. For example, the protect agent 116 may purely rely on the LWED 118 to perform the entity lookup.

Figure 1B:
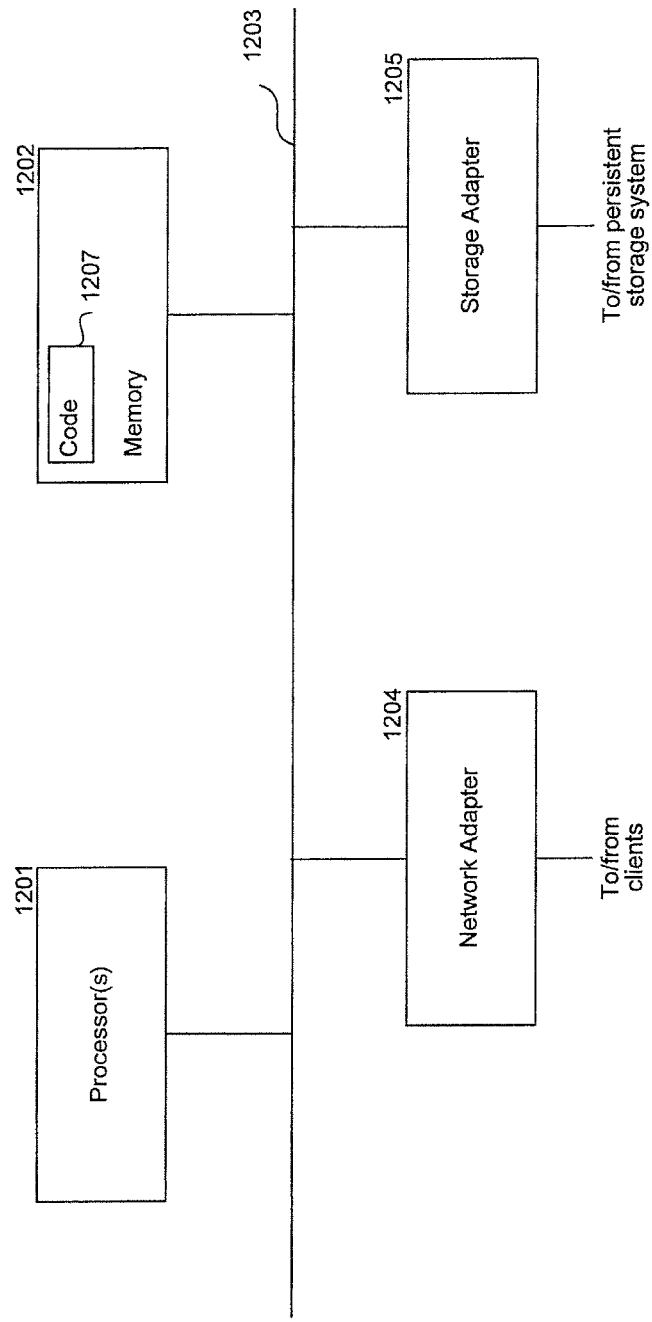
FIG. 1B is a high-level block diagram showing an example of the architecture of an egress point or an entity server.

Now refer to FIG. 1B, which is a high-level block diagram showing an example of the architecture of an egress point (e.g., 111) or an entity server (e.g., 131). The egress ping (e.g., 111) or the entity server (e.g., 131) includes one or more processors 1201 and memory 1202 coupled to an interconnect 1203. The interconnect 1203 shown in FIG. 1B is an abstraction that represents any one or more separate physical buses, point to point connections, or both, connected by appropriate bridges, adapters, or controllers. The interconnect 1203, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The processor(s) 1201 is/are the central processing unit (CPU) of egress point (e.g., 111) or the entity server (e.g., 131) and, thus, control the overall operation of the egress point (e.g., 111) or the entity server (e.g., 131). In certain embodiments, the processor(s) 1201 accomplish this by executing software or firmware stored in memory 1202. The processor(s) 1201 may be, or may include, one or more programmable general-purpose or special-purpose microprocessors, digital signal processors (DSPs), programmable controllers, application specific integrated circuits (ASICs), programmable logic devices (PLDs), trusted platform modules (TPMs), or the like, or a combination of such devices.

The memory 1202 is or includes the main memory of the egress point (e.g., 111) or the entity server (e.g., 131). The memory 1202 represents any form of random access memory (RAM), read-only memory (ROM), flash memory, or the like, or a combination of such devices. In use, the memory 1202 may contain, among other things, code 1207 embodying the protect agent 116.

Also connected to the processor(s) 1201 through the interconnect 1203 are a network adapter 1204 and a storage adapter 1205. The network adapter 1204 provides the egress point (e.g., 111) or the entity server (e.g., 131) with the ability to communicate with remote devices over the interconnect 1203 and may be, for example, an Ethernet adapter or Fiber Channel adapter.

Detailed information on how the protect agents at each egress point secure the entities from unauthorized disclosure is provided with reference to FIGS. 2-5 below.

Figure 2:
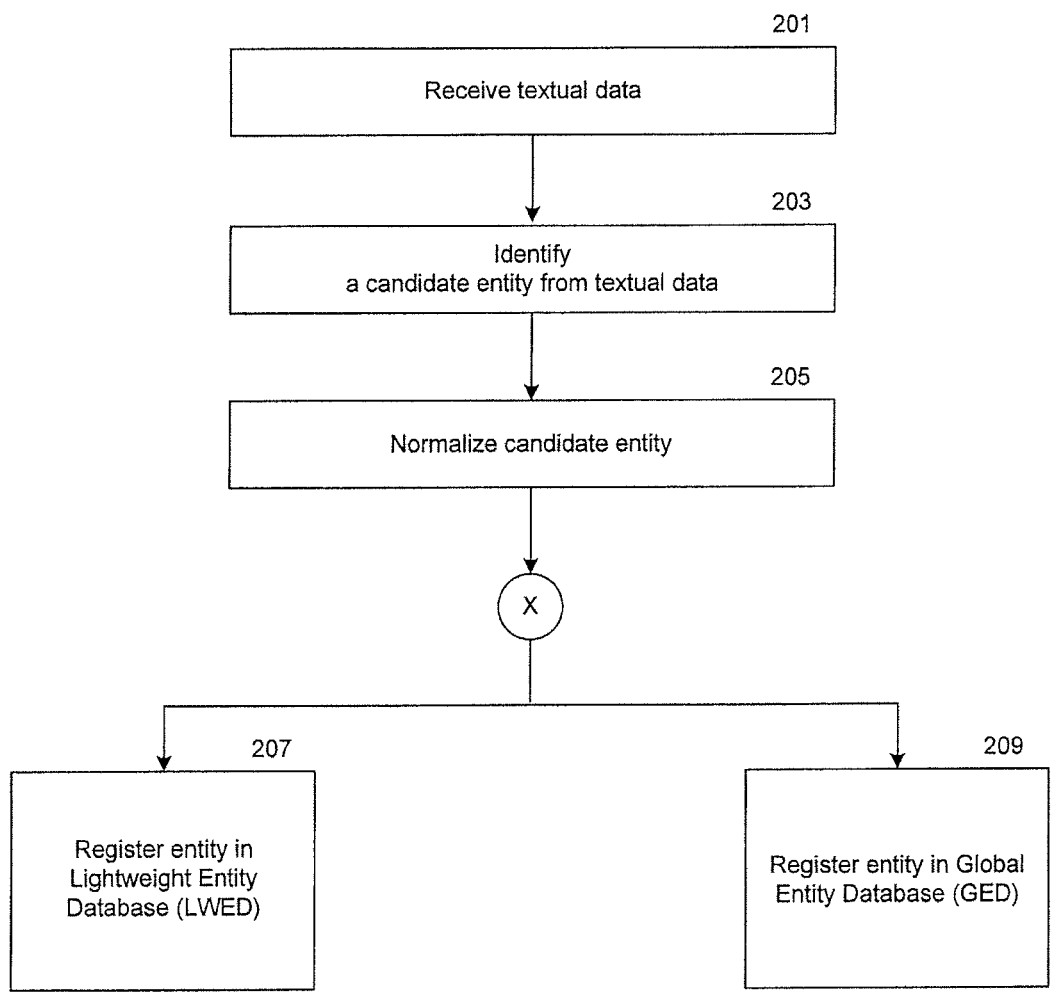
FIG. 2 is a flow diagram depicting a process for registering the entities for the digital information maintained by an organization.

FIG. 2 is a flow diagram depicting a process 200 for registering the entities for the digital information maintained by an organization. At step 201, the process 200 receives digital information (e.g., textual information, image information, etc.). At step 203, the process 200 then parses the received information to identify any potential entities (i.e., candidate entities). In one embodiment, where the received information is in the form of image data, image conversion techniques (e.g., optical character recognition, etc.) may be used to retrieve the text information from such data. The process 200 may use one of several techniques (e.g., pattern recognition, regular expression matching, etc.) to identify the entities. These techniques are described in detail with reference to FIG. 4 below.

In some instances, as indicated in step 205, the candidate entities are optionally normalized to a canonical format. This can be done by converting the candidate entities into one of several raw text formats (e.g., UTF-16 format). By doing this, the protect agent (at a later inspection stage) will be impervious to differences in character encodings, data formats, case folding, etc. in the candidate entities identified during the inspection stage.

The process 200 then proceeds to register the candidate entities within the LWED and/or the GED. At step 207, the process 200 registers the candidate entities into the LWED. Since the LWED is stored at each egress point, the overall size of the database is controlled using one or more techniques. In one embodiment, the candidate entities are converted to hash values before being registered into the LWED. One example of generating a value hash is to compute a hash based function over every character of a word and generating an integer value corresponding to that word. In another embodiment, the candidate entities are compressed by storing them in a data structure that supports membership query while introducing a small probability of false positives in the membership query. An example of such a data structure is a Bloom filter, where a large bit vector and multiple hash functions are used to determine whether a candidate entity being inspected may potentially be present in the LWED. The Bloom filter is implemented using a sequence of software instructions as indicated by an algorithm, and such software is physically stored at a physical memory location at the site of the protect agent. The implementation of the Bloom filter itself is widely known in the art and a person of ordinary skill in the art would be able to reproduce the functions of a Bloom filter to generate the LWED as indicated in this embodiment.

The process 200 also optionally includes the generation of a GED which may be stored, for example, in a remote server (e.g., 131 of FIG. 1A). At step 209, the process 200 stores the candidate entities within the GED. In some instances, the process 200 may convert the candidate entities to hash values before registering the candidate entities. The process 200 may also incorporate metadata information along with the candidate entities while registering the candidate entities. Such metadata information is valuable for auditing and self-remediation purposes. Examples of the uses of metadata information include, for example, identifying the source document associated with the candidate entity, categorizing the entities according to entity type or data type (e.g., patient ID numbers, social security numbers, etc.), associating the entity with a particular risk level, etc.

Figure 3A:
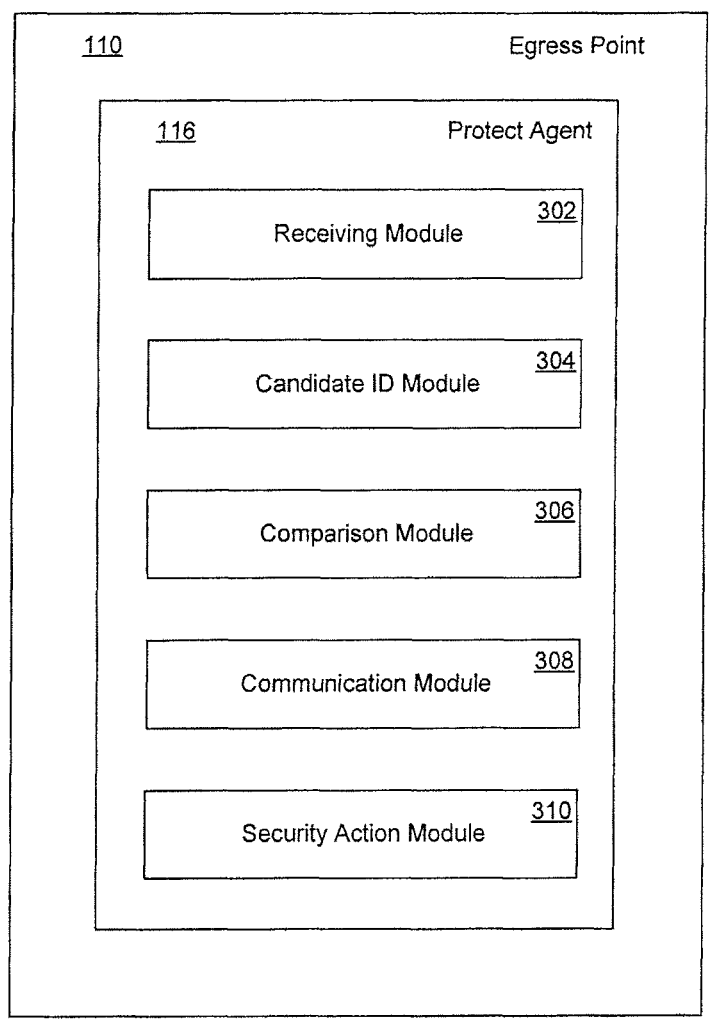
FIG. 3A is a block diagram illustrating an exemplary architecture of an egress point configured to operate a protect agent.

FIG. 3A is a block diagram illustrating an exemplary architecture of an egress point 110 configured to operate a protect agent 116 to inspect data being disclosed through the egress point 110. The protect agent 116 includes a receiving module 302, candidate ID module 304, comparison module 306, a communication module 308, and a security action module 310. As described above, the protect agent 116 can be implemented by using programmable circuitry programmed by software and/or firmware, or by using special-purpose hardwired circuitry, or by using a combination of such embodiments. In some instances, the protect agent 116 is implemented as a unit in the processor 1201 of the egress point 110.

The receiving module 302 is configured to receive the data a user desires to disclose through the egress point 110. This data includes, for example, digital text information. The candidate ID module 304 of the protect agent 116 receives the digital information, and identifies candidate entities from the digital information. Detailed information on identifying candidate entities is provided with reference to FIG. 4 below. The candidate entities may be every word identified in the digital information, or may be words that match a particular format (as, for example, identified by a regular expression matcher). In one embodiment, the candidate ID module 304 may optionally convert the candidate entities to a canonical format, to ensure that the candidate entities are impervious to digital format, character encoding, case-folding, etc. In some embodiments, the candidate ID module 304 may also optionally convert the candidate entities to equivalent hash values (e.g., with the same hashing algorithm used during the registration of the organization's candidate entities). In some instances, the candidate ID module 304 may optionally detect and record an entity type (e.g., social security number type, patient ID type, etc.) of the candidate entity based on the format of the candidate entity The comparison module 306 receives the candidate entities from the candidate ID module 304 and compares the candidate entities with registered entities stored in an entity database. In some instances, the entity database is the LWED stored locally at the site of the egress point 110. The comparison module 206 detects the presence of candidate entities that match any of the registered entities. In some instances, the comparison module 306 directly supplies the list of matching entities to the security action module 310 for further action. In some instances, the comparison module 306 may communicate with a remote server (containing the GED) using a communication module 308 to compare the matching entities (received from the comparison against the LWED) against the registered entities stored in the GED. In this manner, the comparison module 306 can eliminate or at least reduce any false positives that may result from the comparison against the LWED. Additionally, by sending only those candidate entities identified as matching entities to the GED, the server holding the GED has to process only a limited number of candidate entities (as opposed to processing all the candidate entities identified in a textual information). This results in reduced latency time in receiving the final matching results from the GED server. Additionally, in such instances, the GED supplies the comparison module 306 with metadata information associated with the matching entities for further processing.

In some instances, the comparison module 306 may directly communicate with the remote server (i.e., the GED) in lieu of comparing the candidate entities with the LWED. In some instances, the comparison module 306 may utilize the entity type recorded by the candidate ID module 304 to compare the candidate entity only against a subset of registered entities (instead of the entire database of registered entities) that are tagged (e.g., according to their metadata information in the GED) under a similar entity type. This comparison, according to entity type of the candidate entity, further helps in reducing latency/processing time of the comparison process.

The results of the comparison are provided to the security action module 310, which proceeds to initiate an appropriate security action. In some instances, the security action module 310 utilizes metadata retrieved from, for example, the GED, to initiate various types of security actions. Examples of such security actions include preventing the information from being transmitted out through the associated egress point, sending out a security alert to a system administrator, revoking the user's access to the particular information, alerting the user of the security violation, etc. The security actions may also include integration with third party software to offer security solutions (e.g., integration with Microsoft Windows®. RMS to apply rights management to the information being disclosed). It is understood that these examples of security actions are provided for illustrative purposes only, and that other security actions known to people skilled in the art are equally applicable here.

Figure 3B:
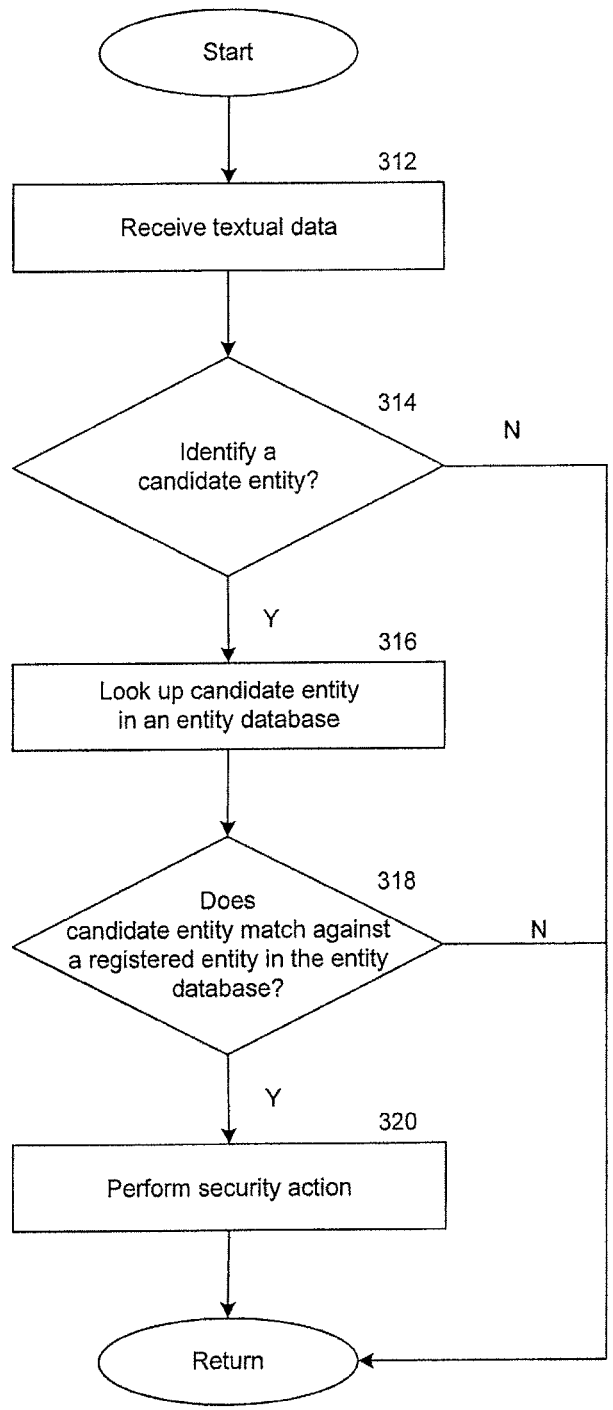
FIG. 3B is a flow diagram illustrating an exemplary inspection process performed by the protect agent

FIG. 3B is a flow diagram illustrating an exemplary inspection process 300 performed by the protect agent 116. At step 312, the process 300 receives digital information (e.g., textual data). At step 314, the process 300 identifies one or more candidate entities from the received textual information. As described above, the process 300 may optionally record the entity type of the candidate entities, and may also convert the candidate entities to a canonical format and/or hash values. If the process 300 does not identify any candidate entities at step 314, the process 300 returns and may repeat the process of receiving textual information for inspection.

At step 316, the process 300 looks up the candidate entities against registered entities in an entity database. As described above, the entity database may be an AWED and/or the GED. At 318, the process 300 determines whether the candidate entities match against one of the registered entities in the entity database. If the process 300 determines that at least one of the candidate entities matches against the registered entities, the process 300 proceeds to step 320 to perform a security action. As discussed above, the process 300 may use metadata information retrieved from the entity database to initiate appropriate security actions.

Figure 4:
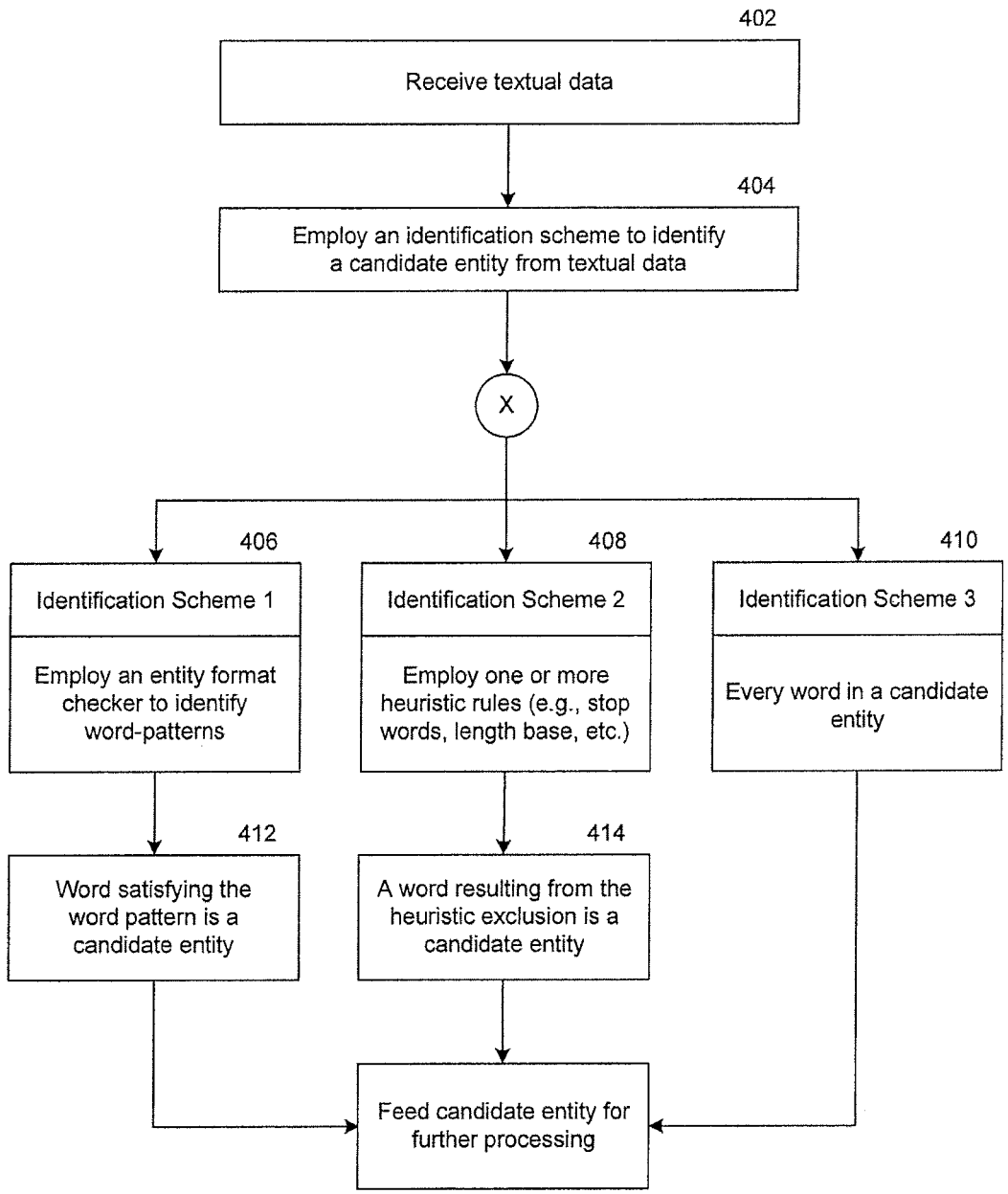
FIG. 4 is a flow diagram illustrating various mechanisms used by the registration process and the inspection process to identify a candidate entity.

FIG. 4 is a flow diagram illustrating various mechanisms used by the registration process (e.g., step 205 of FIG. 2) and the inspection process (e.g., step 314 of FIG. 3B) to identify a candidate entity. The process receives textual information at step 402, and proceeds to identify candidate entities at step 404. As illustrated in FIG. 4, the candidate entity may be chosen according to one or more of the following identification schemes. Step 406 represents identification scheme 1, where the process employs an entity format checker to identify word-patterns or word-formats. For example, a regular expression matcher may be used to identify regular expressions (e.g., a social security number expression structured according to a particular pattern) in the received textual information. Accordingly, at step 412, the process records any entity in the textual data that satisfies the particular word-pattern or word-format targeted by the entity format checker.

Step 408 represents identification scheme 2, where the process employs one or more heuristic rules to exclude or skip over non-entity words. In a first example, the heuristic rule may define stop words that can be skipped over. Examples of stop words include words that commonly occur in the language (e.g., prepositions, etc.), common words considered non-confidential by the organization (e.g., address information, disclaimer language included by default in patient admittance forms, etc.). In a second example, the heuristic rule may require any words shorter than the shortest word in the entity database (or longer than the longest word in the entity database) to be excluded from consideration as a candidate entity. Other similar heuristic rules, as appreciated by a person of ordinary skill in the art, can also be employed in implementing the identification scheme 2 described herein. As indicated in step 414, the words that are not excluded by the heuristic rule are submitted as candidate entities.

Step 410 represents identification scheme 3, where every word (e.g., every set of characters demarcated by one or more spaces) in the received textual information is treated as a candidate entity. It is understood that a person of ordinary skill in the art may combine one or more of these identification schemes, or add other identification schemes that are readily apparent to such a person, to improve the efficiency of the candidate entity identification process.

Figure 5:
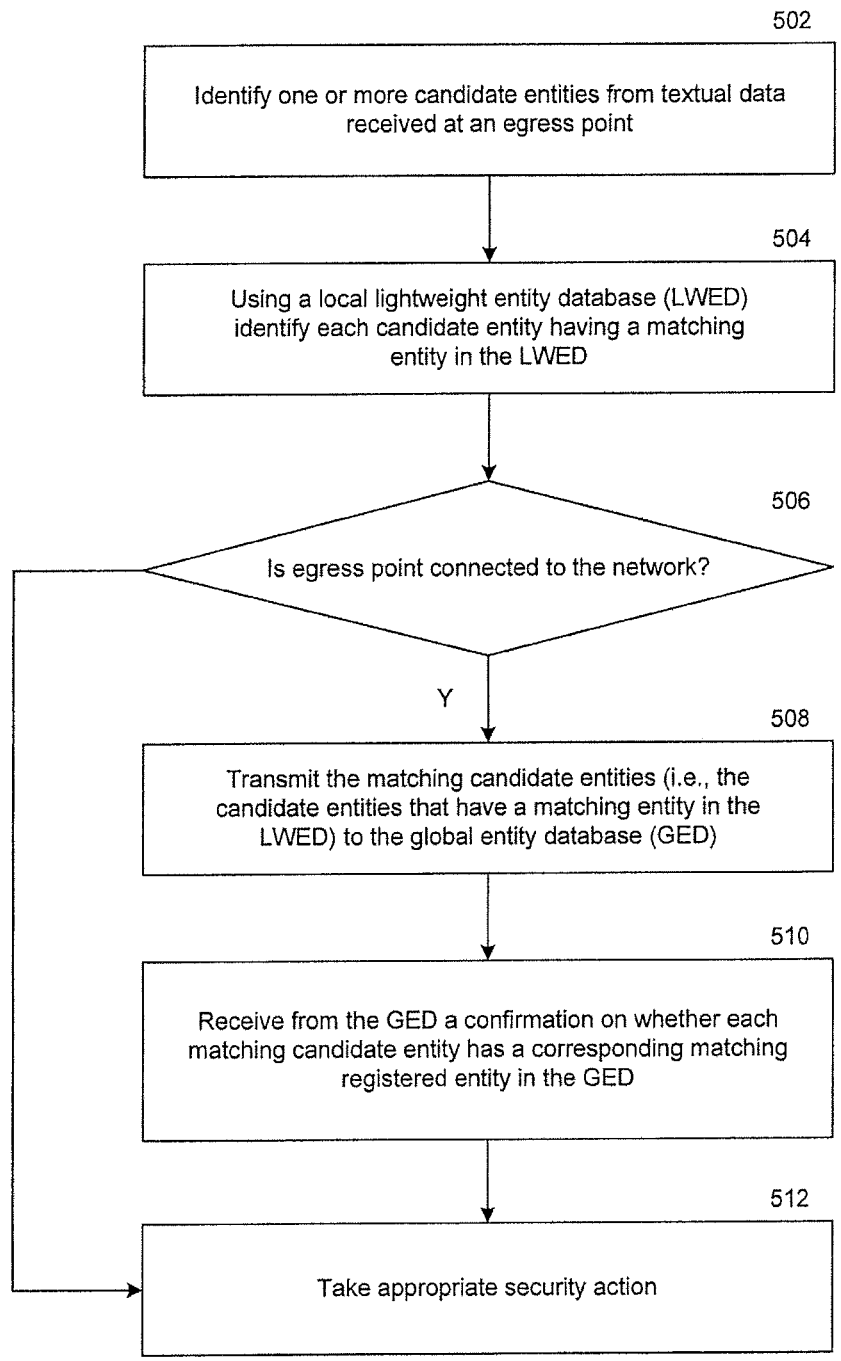
FIG. 5 is a flow diagram depicting an exemplary process 500 for comparison of the received candidate entities.

FIG. 5 is a flow diagram depicting an exemplary process 500 for comparison of the received candidate entities. At step 500, the process identifies the candidate entities that need to be compared against the registered entities in the entity database. At step 504, the process 500 matches the candidate entities against registered entities in an LWED located at the site of the egress point. Using this lookup, the process 500 generates a list of candidate entities that match against any of the registered entities. In some instances, the process 500 directly communicates this information to a security action module to initiate appropriate security action. In other instances, as indicated in step 506, the process 500 determines whether the egress point is connected to the network. If the egress point is not connected to the network, the process 500 proceeds to step 512, where the process 500 initiates an appropriate security action.

If the egress point is connected to the network, then the process 500 transmits the matching candidate entities to the remote server holding the GED. The GED server compares the received candidate entities against the registered entities in the GED. This allows the process 500 to eliminate or reduce the number of false positives that may have been identified by the comparison against LWED. Additionally, by sending only those candidate entities identified as matching entities to the GED, the GED server has to process only a limited number of candidate entities (as opposed to processing all the candidate entities identified in a textual information). This results in reduced latency time in receiving the final matching results from the GED server. Additionally, the GED server may also return metadata information associated with the matching candidate entities. The process 500 then proceeds to step 512 to initiate one or more security actions.

It is emphasized, however, that in some embodiments, the process 500 may operate by matching the candidate entities exclusively against the LWED (i.e., by initiating the security action subsequent to comparison of the candidate entities against the registered entities in the LWED). In other embodiments, the process 500 may operate by matching the candidate entities exclusively against the GED (i.e., by directly comparing the candidate entities against the GED instead of the LWED).

The techniques introduced above can be implemented by programmable circuitry programmed or configured by software and/or firmware, or entirely by special-purpose circuitry, or in a combination of such forms. Such special-purpose circuitry (if any) can be in the form of, for example, one or more application-specific integrated circuits (ASICs), programmable logic devices (PLDs), field-programmable gate arrays (FPGAs), etc.

Software or firmware for implementing the techniques introduced here may be stored on a machine-readable storage medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

The term "logic", as used herein, can include, for example, special-purpose hardwired circuitry, software and/or firmware in conjunction with programmable circuitry, or a combination thereof.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed:

1. A computer system secured against unauthorized communications of outgoing messages comprised of at least one exact data word from an egress point of the computer system, the computer system comprising:
   a memory;
   at least one server;
   at least one remote device connected to the at least one server by a data network, wherein the at least one remote device is authorized to communicate with the at least one server using the data network in order to transmit to the at least one server the outgoing messages comprised of at least one predetermined exact data word,
   wherein the at least one server includes a data scanning component, the data scanning component configured by logic to:
     detect at least one candidate exact data word by parsing alphanumeric text data within an outgoing message transmitted to the at least one server from the at least one remote device, the alphanumeric text data representing the at least one candidate exact data word,
     attempt to match the detected at least one candidate exact data word against a predetermined set of exact data words,
     in dependence on a result of the matching attempt, select at least one security rule and determine a security action using the selected at least one security rule, wherein the selected at least one security rule is comprised of a data structure encoding a logical test for determining whether a subset of the predetermined set of exact data words is present within the outgoing message, said subset being selected by utilizing a heuristic engine that applies a heuristic word selection rule, and wherein the heuristic word selection rule comprises:
       skipping over a second word from a plurality of words when the second word has a word-length that is shorter than a first word-length of a shortest registered entity of a plurality of compressed registered entities; and
       skipping over a third word from a plurality of words when the third word has a word-length that is longer than a second word-length of a longest registered entity of the plurality of compressed registered entities, and
     execute the determined security action on the matched at least one candidate exact data word prior to permitting transmission of the outgoing message through the egress point.

2. The computer system of claim 1, wherein the heuristic word selection rule is comprised further of:
   skipping over a first word from a plurality of words when the first word matches a first stop word of a plurality of stop words.

3. The computer system of claim 1, wherein the data scanning component is further configured by logic to convert a portion of the outgoing message into a canonical format, wherein the canonical format causes the data scanning component to be impervious to differences in digital format and character encoding.

4. The computer system of claim 1, wherein the selected at least one security rule corresponds to at least one corresponding data type that is to be secured from unauthorized transmission.

5. The computer system of claim 1, wherein the determined security action is comprised of:
   preventing a portion of data comprising the matched at least one candidate exact data word from being transmitted through the egress point to an exterior of the computer system.

6. The computer system of claim 1, wherein the data scanning component is further configured by logic to scan the outgoing message using a first at least one security rule to identify a set of at least one exact data word of a predetermined set of words, wherein a portion of content of the outgoing message transmitted to the at least one server is the identified set of at least one exact data word;

wherein the at least one server is further configured by logic to reduce a possibility that the identified set of at least one exact data word is comprised of a false positive;

wherein the at least one server is further configured by logic to automatically generate an acknowledgement message encoding whether each exact data word in the identified set of at least one exact data word matches the selected at least one security rule stored on the at least one server, and transmit the acknowledgement message to the at least one remote device; and wherein the at least one server is further configured by logic to perform the determined security action on the outgoing message before the outgoing message is transmitted through the egress point.

7. The computer system of claim 6, wherein the selected at least one security rule stored on the at least one server encodes a logical condition dependent on at least one of location of the matched at least one candidate exact data word within a document comprising the outgoing message; a data type associated with the matched at least one candidate exact data word comprising content of the outgoing message or an origin information of a particular document.

8. The computer system of claim 6, wherein the determined security action includes one or more of:
preventing the matched at least one candidate exact data word of the outgoing message from being transmitted through the egress point;
logging transmission of content of the outgoing message as a security violation; and
actuating a user interface process on the at least one remote device for requiring a password from a user to allow the portion of the content of the outgoing message to be disclosed.

9. The computer system of claim 1, wherein the determined security action is comprised of:
logging transmission of a portion of content of the outgoing message as a security violation.

10. The computer system of claim 1, wherein the determined security action is comprised of:
operating a user interface protocol on the at least one remote device for requiring a password from a user to allow a portion of content of the outgoing message to be transmitted.

11. The computer system of claim 1, wherein the determined security action is comprised of:
blocking access by a user who transmitted a portion of content of the outgoing message to a user of the at least one remote device.

12. The computer system of claim 1, wherein the determined security action is comprised of:
transmitting a security alert.

13. The computer system of claim 1, wherein the determined security action is comprised of:
integration of a portion of content of the outgoing message with rights management information.

14. The computer system of claim 1, wherein the detected at least one candidate exact data word matching at least one exact data word of the predetermined set of exact data words indicates that the outgoing message is confidential.

15. A method executed by a computer system comprised of at least one server and a remote computer connected to the at least one server by a data network, to secure the computer system against unauthorized external communications of data items from an egress point of the computer system, said method comprising:

transmitting from the remote computer to the at least one server an outgoing message comprised of a document;

using the at least one server to automatically inspect data comprising content of the outgoing message received from the remote computer to determine if the outgoing message is comprised of data indicating a message destination accessed through the egress point;

in dependence on the determination and prior to permitting transmission of the outgoing message, scanning by parsing alphanumeric text data comprising the content of the outgoing message in order to detect at least one exact data word; and using the at least one server to determine a security action by executing an at least one security rule on the detected at least one exact data word and executing the determined security action on the outgoing message prior to permitting transmission of the outgoing message through the egress point, wherein the at least one security rule is comprised of a data structure encoding a logical test for determining whether a subset of a predetermined set of exact data words is present within the outgoing message, said subset being selected by utilizing a heuristic engine that applies a heuristic exact data word selection rule, and wherein the heuristic exact data word selection rule comprises:

skipping over a second word from a plurality of words when the second word has a word-length that is shorter than a first word-length of a shortest registered entity of a plurality of compressed registered entities; and skipping over a third word from a plurality of words when the third word has a word-length that is longer than a second word-length of a longest registered entity of a plurality of compressed registered entities.

16. The method of claim 15, wherein the heuristic exact data word selection rule is comprised further of:
skipping over a first word from a plurality of words when the first word matches a first stop word of a plurality of stop words.

17. The method of claim 15, further comprising:
using the at least one server to convert a portion of the outgoing message into a canonical format, wherein the canonical format causes the scanning step to be impervious to differences in digital format and character encoding.

18. The method of claim 15, wherein the at least one security rule corresponds to at least one corresponding entity exact data word that is to be secured from unauthorized transmission.

19. The method of claim 15, wherein the determined security action includes one or more of:
preventing a portion of data comprising the detected at least one exact data word of the outgoing message from being transmitted through the egress point;
operating a user interface process on the remote computer for requiring a password from a user to allow a portion of the outgoing message to be transmitted; or
integrating a portion of the outgoing message with rights management information.

20. The method of claim 15, further comprising:
using the at least one server to scan the outgoing message using the at least one security rule to identify a set of at least one exact data word of a predetermined set of exact data words;
automatically generating an acknowledgement message encoding whether each exact data word in the identified set of at least one exact data word matches the at least one security rule;
transmitting the acknowledgement message to the remote computer; and
using the at least one server to perform the determined security action on the outgoing message before the outgoing message is transmitted through the egress point.

21. The method of claim 20, wherein the at least one security rule encodes a logical condition dependent on at least one of:
a location of the detected exact data word comprising the content of the outgoing message within the document, or a data type associated with the detected exact data word comprising the content of the outgoing message.

22. The method of claim 15, wherein the determined security action is comprised of:
logging transmission of a portion of content of the outgoing message as a security violation.

23. The method of claim 15, wherein the determined security action is comprised of:
operating a user interface protocol on the remote computer for requiring a password from a user to allow a portion of the content of the outgoing message to be transmitted.

24. The method of claim 15, wherein the determined security action is comprised of:
blocking access by a user who transmitted a portion of the content of the outgoing message to a user of the remote computer.

25. The method of claim 15, wherein the determined security action is comprised of:
transmitting a security alert.

26. The method of claim 15, wherein the determined security action is comprised of: integration of a portion of the content of the outgoing message with rights management information.

* * * * *